(12) United States Patent
Lim et al.

(10) Patent No.: US 12,323,366 B2
(45) Date of Patent: Jun. 3, 2025

(54) METHOD AND DEVICE FOR CONFIGURING EHT-SIG INCLUDING ALLOCATION INFORMATION ABOUT MRU IN WIRELESS LAN SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 17/924,322

(22) PCT Filed: May 14, 2021

(86) PCT No.: PCT/KR2021/006083
§ 371 (c)(1),
(2) Date: Nov. 9, 2022

(87) PCT Pub. No.: WO2021/235780
PCT Pub. Date: Nov. 25, 2021

(65) Prior Publication Data
US 2023/0188304 A1 Jun. 15, 2023

(30) Foreign Application Priority Data

May 20, 2020 (KR) .................. 10-2020-0060457
Jun. 9, 2020 (KR) .................. 10-2020-0069759
(Continued)

(51) Int. Cl.
*H04B 7/0452* (2017.01)
*H04L 5/00* (2006.01)
*H04W 84/12* (2009.01)

(52) U.S. Cl.
CPC ......... *H04L 5/0092* (2013.01); *H04B 7/0452* (2013.01); *H04W 84/12* (2013.01)

(58) Field of Classification Search
None
See application file for complete search history.

(56) References Cited

U.S. PATENT DOCUMENTS

2017/0181129 A1* 6/2017 Bharadwaj ............ H04L 5/0053
2017/0181136 A1* 6/2017 Bharadwaj ............ H04W 72/12
(Continued)

FOREIGN PATENT DOCUMENTS

| KR | 10-2018-0030457 A | 3/2018 |
| KR | 10-2018-0097555 A | 8/2018 |
| KR | 10-1926720 B1 | 12/2018 |

OTHER PUBLICATIONS

Cisco Systems, "Resolution to HESIGB and Related Comments", IEEE 802.11-19/1871r2, Nov. 19, 2019 (https://www.ieee802.org/11/Reports/tgax_update.htm#mar2020), see pp. 5-6.

*Primary Examiner* — Benjamin Lamont
(74) *Attorney, Agent, or Firm* — BRYAN CAVE LEIGHTON PAISNER LLP

(57) ABSTRACT

A method and a device for receiving a PPDU in a wireless LAN system are presented. Particularly, a receiving STA receives a PPDU from a transmitting STA through a broadband and decodes the PPDU. The PPDU includes a first signal filed and a data field. A 160 MHz band includes first and second 80 MHz segments if the broadband is the 160 MHz band. The first 80 MHz segment includes first to fourth 20 MHz channels, and the second 80 MHz segment includes fifth to eighth 20 MHz channels. The first signal field includes first and second signal CCs for the first 80 MHz segment and includes third and fourth signal CCs for the second 80 MHz segment.

15 Claims, 23 Drawing Sheets

(30) Foreign Application Priority Data

Jun. 11, 2020 (KR) ........................ 10-2020-0071032
Jun. 24, 2020 (KR) ........................ 10-2020-0077248

(56) References Cited

U.S. PATENT DOCUMENTS

| | | | |
|---|---|---|---|
| 2017/0230952 A1* | 8/2017 | Choi .................... | H04W 84/12 |
| 2018/0288754 A1* | 10/2018 | Choi .................... | H04L 5/0064 |
| 2018/0302858 A1* | 10/2018 | Son ................... | H04W 52/0229 |
| 2019/0069298 A1* | 2/2019 | Chen ................. | H04W 72/0453 |
| 2019/0116513 A1* | 4/2019 | Verma ................. | H04W 74/002 |
| 2019/0141570 A1 | 5/2019 | Verma et al. | |
| 2019/0222392 A1* | 7/2019 | Lin ....................... | H04L 5/0053 |
| 2019/0238301 A1* | 8/2019 | Verma .................. | H04L 5/0046 |
| 2020/0112910 A1* | 4/2020 | Cherian ............ | H04W 72/0446 |
| 2020/0177425 A1* | 6/2020 | Chen .................. | H04L 27/2602 |
| 2021/0045151 A1* | 2/2021 | Chen .................. | H04L 27/2602 |
| 2021/0212035 A1* | 7/2021 | Son ..................... | H04W 72/121 |
| 2021/0360628 A1* | 11/2021 | Kim ..................... | H04L 5/0098 |

* cited by examiner

FIG. 1
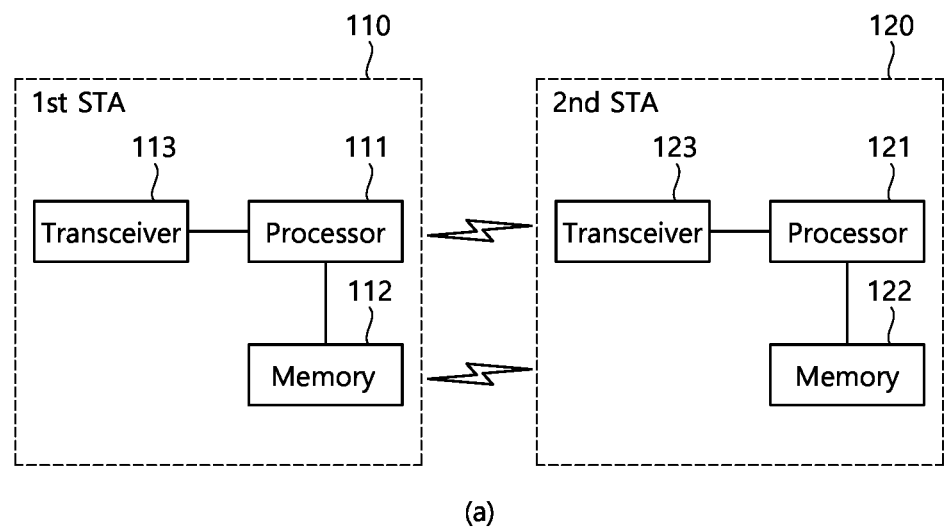
(a)
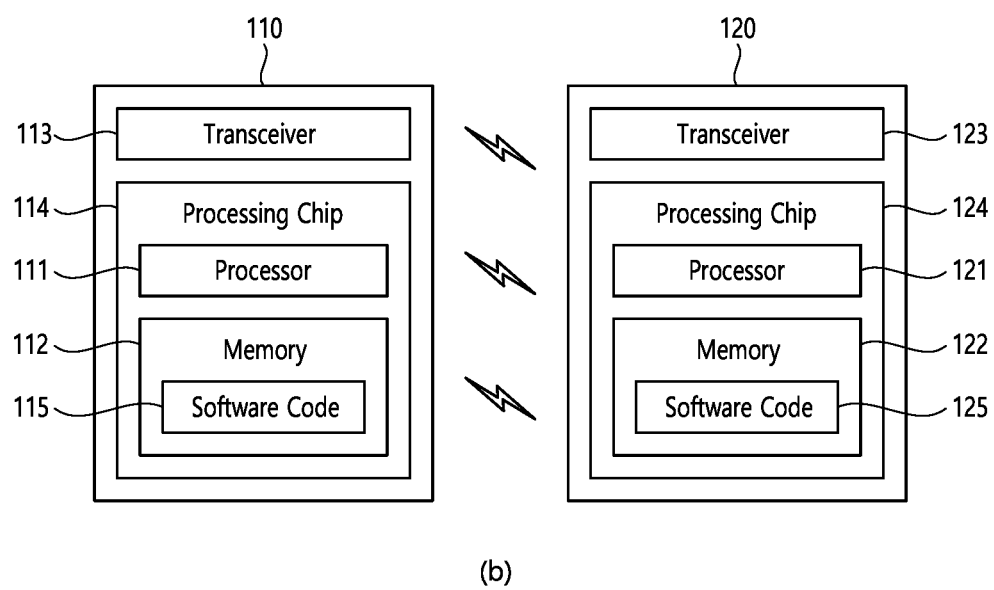
(b)

FIG. 2
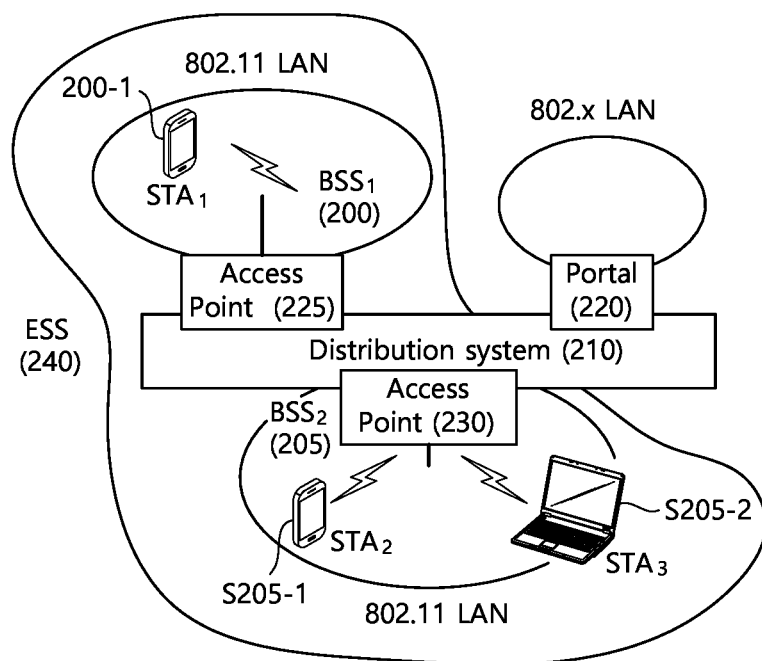
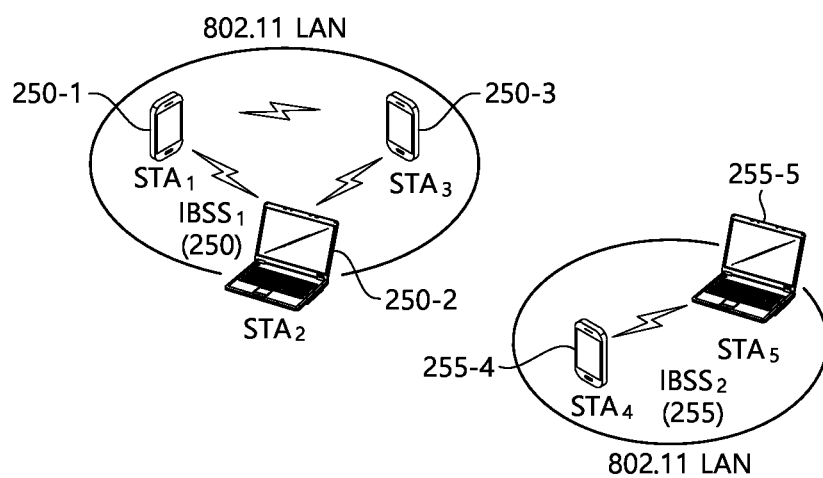

FIG. 15

| Index | 1 | 2 | 3 | 4 | 5 | 6 | 7 | 8 | 9 |
|---|---|---|---|---|---|---|---|---|---|
| 1 | 26 | 26+52 | | 26 | 26 | 26 | 26 | 26 |
| 2 | 26 | 26+52 | | 26 | 26 | 26 | 52 | |
| 3 | 26 | 26+52 | | 26 | 52 | | 26 | 26 |
| 4 | 26 | 26+52 | | 26 | 52 | | 52 | |
| 5 | 26 | 26+52 | | 26 | 106 | | | |
| 6 | 26 | 26 | 26 | 26 | 26 | 52+26 | | 26 |
| 7 | 26 | 26 | 52 | | 26 | 26+52 | | 26 |
| 8 | 52 | | 26 | 26 | 26 | 26+52 | | 26 |
| 9 | 52 | | 52 | | 26 | 26+52 | | 26 |
| 10 | 106 | | | | 26 | 26+52 | | 26 |
| 11 | 26 | 26+52 | | 26 | 26+52 | | 26 | |

FIG. 16

| Index | 1 | 2 | 3 | 4 | 5 | 6 | 7 | 8 | 9 |
|---|---|---|---|---|---|---|---|---|---|
| 1 | 26 | 26 | 26 | 26 | 26+106 | | | | |
| 2 | 26 | 26 | 52 | | 26+106 | | | | |
| 3 | 52 | | 26 | 26 | 26+106 | | | | |
| 4 | 52 | | 52 | | 26+106 | | | | |
| 5 | 106 | | | | 26+106 | | | | |
| 6 | 106+26 | | | | 26 | 26 | 26 | 26 | |
| 7 | 106+26 | | | | 26 | 26 | 52 | | |
| 8 | 106+26 | | | | 52 | | 26 | 26 | |
| 9 | 106+26 | | | | 52 | | 52 | | |
| 10 | 106+26 | | | | 106 | | | | |

FIG. 17

| Index | 1 | 2 | 3 | 4 | 5 | 6 | 7 | 8 | 9 |
|---|---|---|---|---|---|---|---|---|---|
| 1 | | | 106+26 | | | | 52+26 | | 26 |
| 2 | 26 | | 26+52 | | | | 26+106 | | |

FIG. 18

| Index | 1 | 2 | 3 | 4 |
|---|---|---|---|---|
| 1 | 242(1) | 242(2) | 484(2) | |
| 2 | 242(1) | 242(2) | 484(2) | |
| 3 | 484(1) | | 242(3) | 242(4) |
| 4 | 484(1) | | 242(3) | 242(4) |

FIG. 19

| Index | 1 | 2 | 3 | 4 | 5 | 6 | 7 | 8 |
|---|---|---|---|---|---|---|---|---|
| 1 | 484(1) | | 484(2) | | | 996(2) | | |
| 2 | 484(1) | | 484(2) | | | 996(2) | | |
| 3 | | 996(1) | | | 484(3) | | 484(4) | |
| 4 | | 996(1) | | | 484(3) | | 484(4) | |

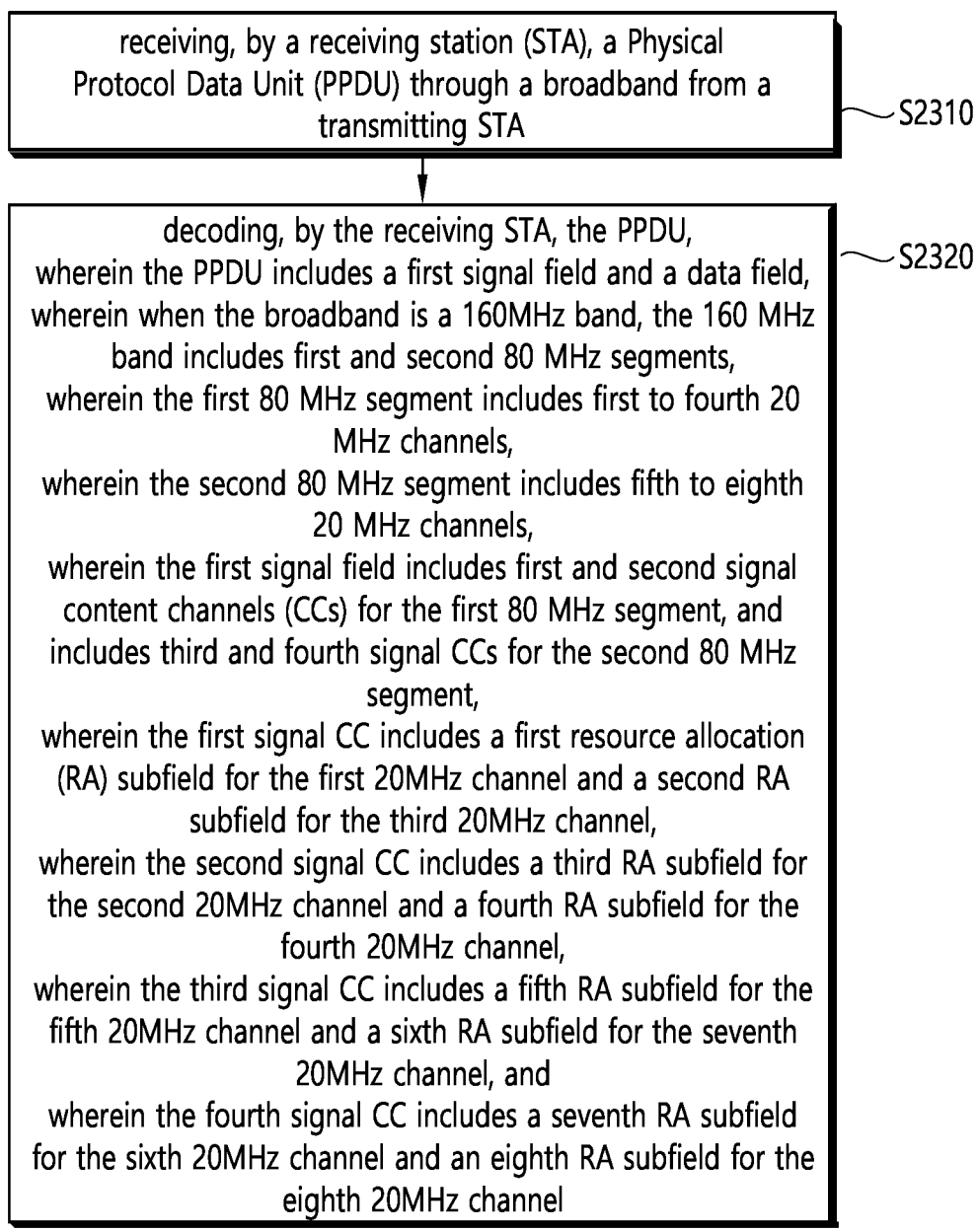

METHOD AND DEVICE FOR CONFIGURING EHT-SIG INCLUDING ALLOCATION INFORMATION ABOUT MRU IN WIRELESS LAN SYSTEM

CROSS REFERENCE TO RELATED APPLICATIONS

This application is the National Stage filing under 35 U.S.C. 371 of International Application No. PCT/KR2021/006083, filed on May 14, 2021, which claims the benefit of and priority to Korean Patent Application No. 10-2020-0060457, filed on May 20, 2020, Korean Patent Application No. 10-2020-0069759, filed on Jun. 9, 2020, Korean Patent Application No. 10-2020-0071032, filed on Jun. 11, 2020 and Korean Patent Application No. 10-2020-0077248, filed on Jun. 24, 2020, the contents of which are all hereby incorporated by reference herein in their entirety.

TECHNICAL FIELD

The present specification relates to a technique for receiving a PPDU through a broadband in a WLAN system, and more particularly, a method and apparatus for configuring an EHT-SIG including allocation information for an MRU.

BACKGROUND

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

An increased number of spatial streams may be used in the new wireless LAN standard. In this case, in order to properly use the increased number of spatial streams, a signaling technique in the WLAN system may need to be improved.

SUMMARY

The present specification proposes a method and apparatus for configuring an EHT-SIG including allocation information for an MRU in a WLAN system.

An example of the present specification proposes a method for receiving a PPDU through a broadband.

The present embodiment may be performed in a network environment in which a next-generation wireless LAN system (IEEE 802.11be or EHT wireless LAN system) is supported. The next-generation wireless LAN system may be a wireless LAN system improved from the 802.11ax system, and may satisfy backward compatibility with the 802.11ax system.

This embodiment proposes a method of signaling allocation information for a Multiple Resource Unit (MRU) defined in an 802.11be WLAN system. In particular, this embodiment proposes a method of configuring an EHT-SIG including allocation information for an MRU.

A receiving station (STA) receives a Physical Protocol Data Unit (PPDU) from a transmitting STA through a broadband.

The receiving STA decodes the PPDU.

The PPDU includes a first signal field and a data field. The first signal field may be an Extremely High Throughput-Signal (EHT-SIG).

When the broadband is a 160 MHz band, the 160 MHz band includes first and second 80 MHz segments. The first 80 MHz segment includes first to fourth 20 MHz channels, and the second 80 MHz segment includes fifth to eighth 20 MHz channels.

The first signal field includes first and second signal content channels (CCs) for the first 80 MHz segment, and includes third and fourth signal CCs for the second 80 MHz segment.

The first signal CC includes a first resource allocation (RA) subfield for the first 20 MHz channel and a second RA subfield for the third 20 MHz channel. The second signal CC includes a third RA subfield for the second 20 MHz channel and a fourth RA subfield for the fourth 20 MHz channel. The third signal CC includes a fifth RA subfield for the fifth 20 MHz channel and a sixth RA subfield for the seventh 20 MHz channel. The fourth signal CC includes a seventh RA subfield for the sixth 20 MHz channel and an eighth RA subfield for the eighth 20 MHz channel.

According to the embodiment proposed herein, signaling overhead can be reduced by efficiently indicating allocation information for MRUs in consideration of SST operation. There is an effect that efficient signal transmission and reception is possible by using an MRU suitable for a channel situation.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 15 shows an example of 26+52RU configured by aggregation of small size RUs.

FIG. 16 shows an example of 26+106 RU configured by aggregation of small size RUs.

FIG. 17 shows an example of 26+52RU and 26+106RU configured by aggregation of small size RUs.

FIG. 18 shows an example of 242+484RU configured by an aggregation of large size RUs.

FIG. 19 shows an example of 484+996RU configured by an aggregation of large size RUs.

FIG. 23 is a flowchart illustrating a procedure in which a receiving STA receives a PPDU according to the present embodiment.

DETAILED DESCRIPTION

Figure 3:
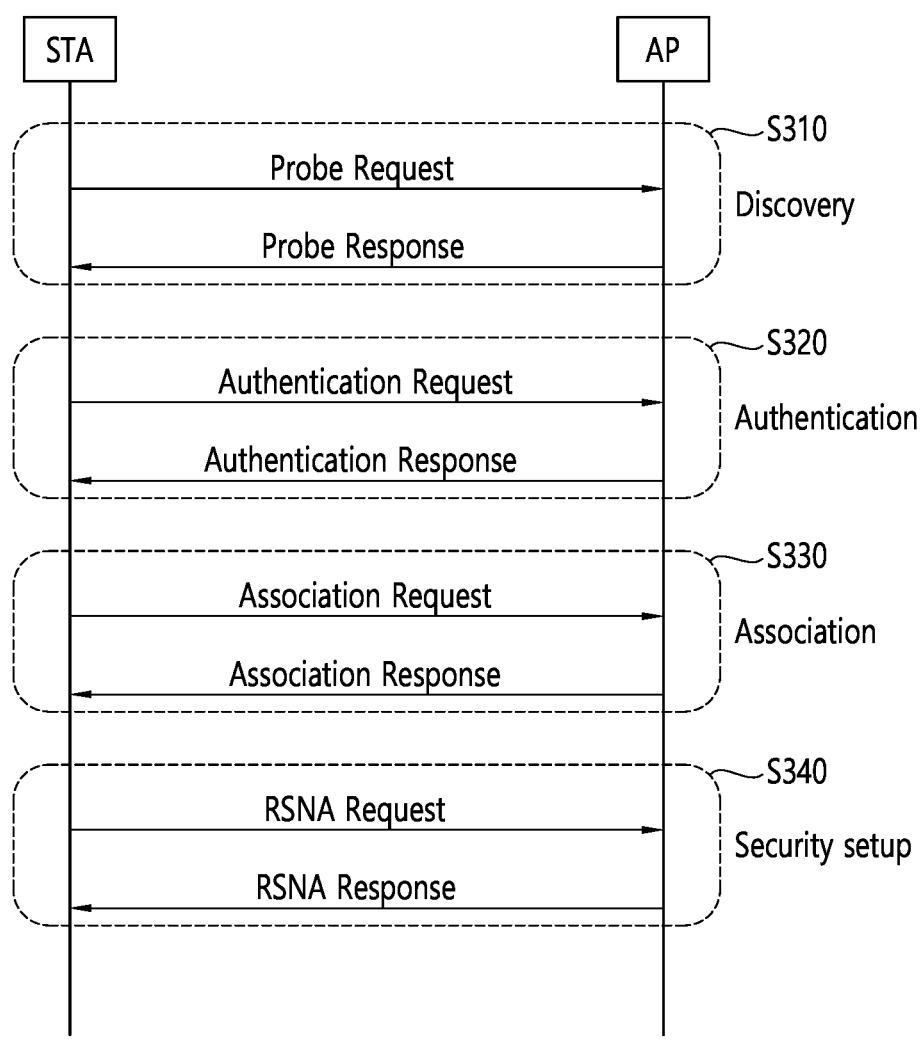
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
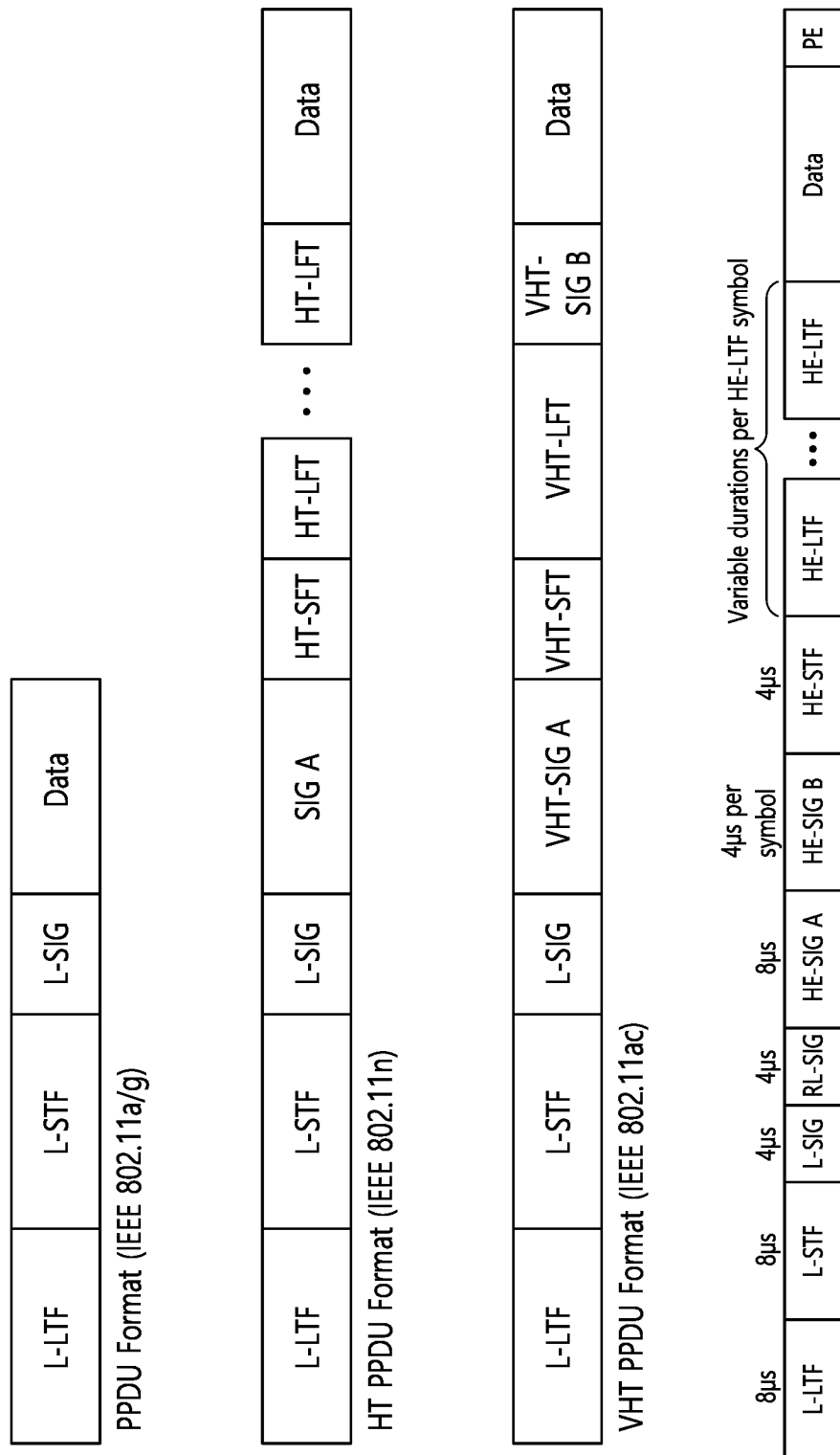
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
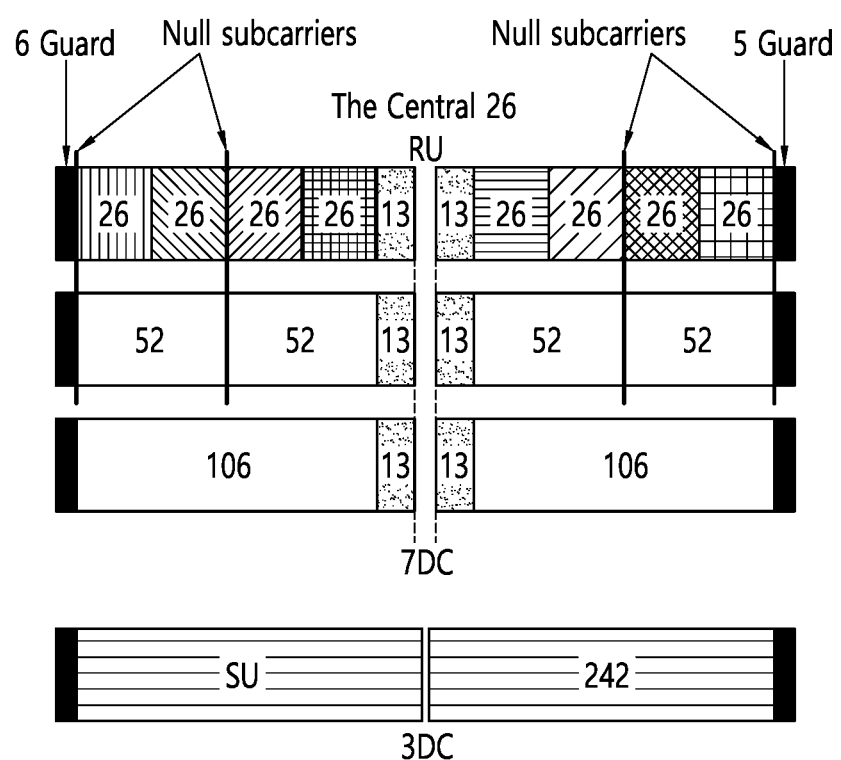
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
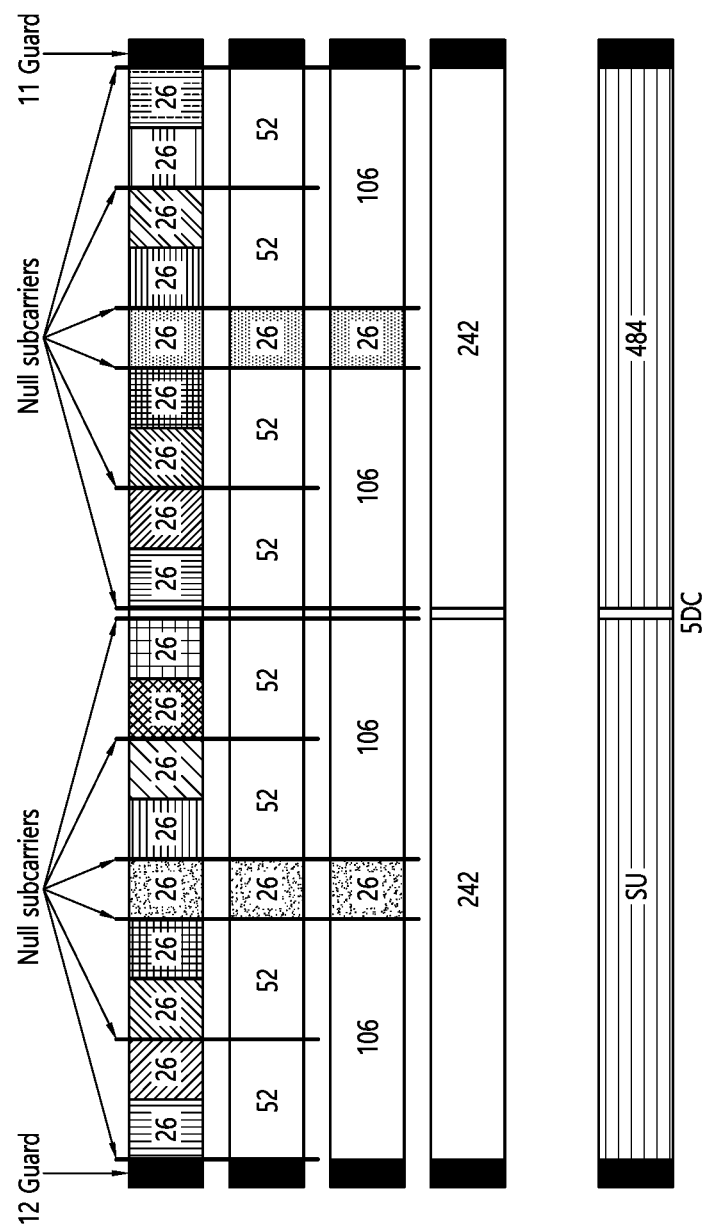
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
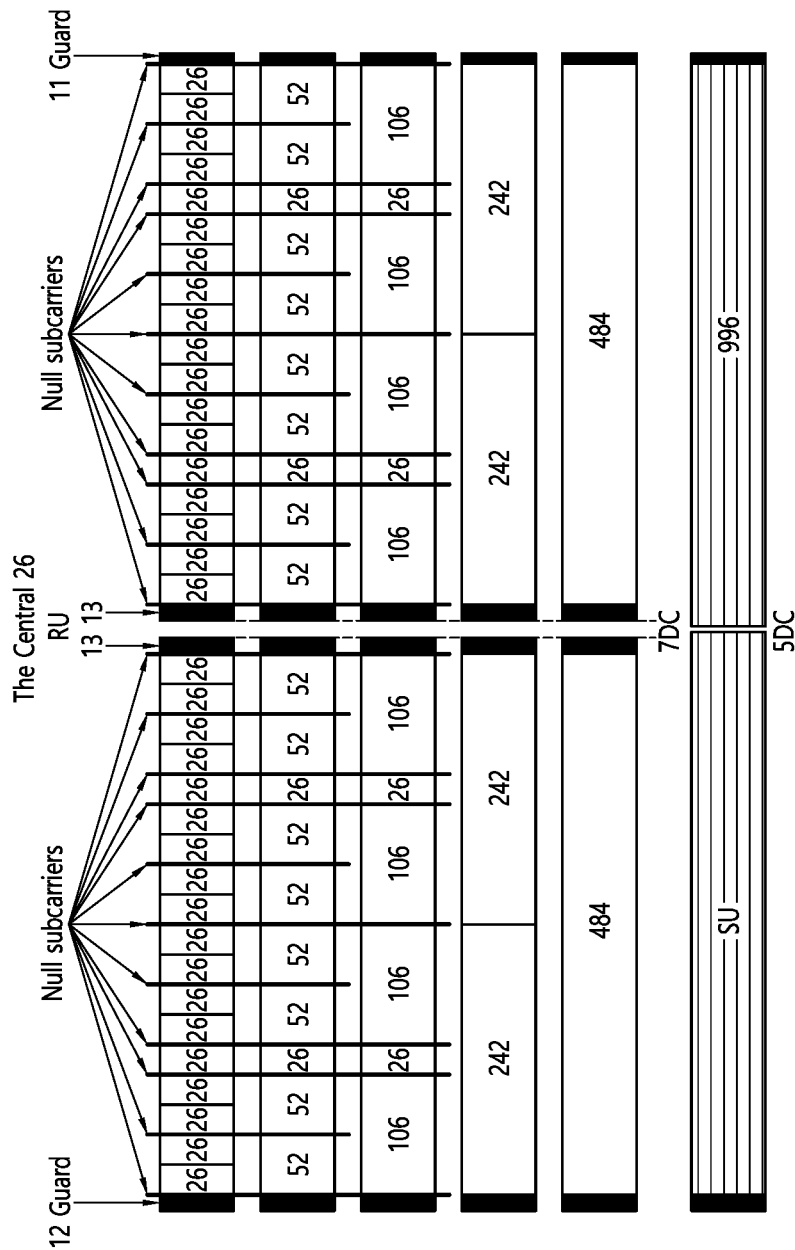
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
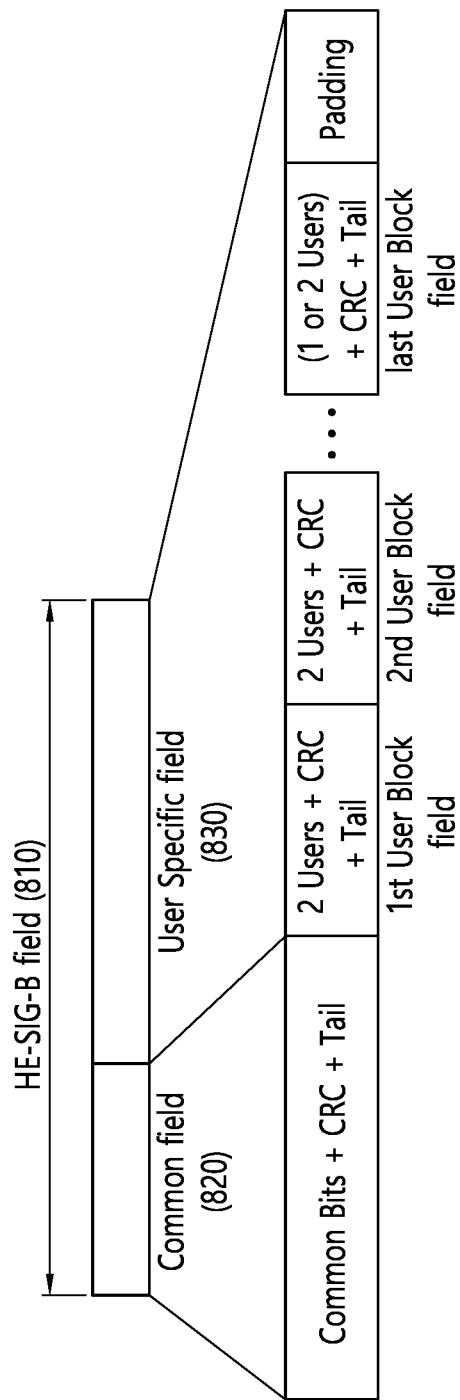
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | | 106 | | 26 | 26 | 26 | 26 | 26 | 8 |
| $01001y_2y_1y_0$ | | | 106 | | 26 | 26 | 26 | 52 | | 8 |

"$01000y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
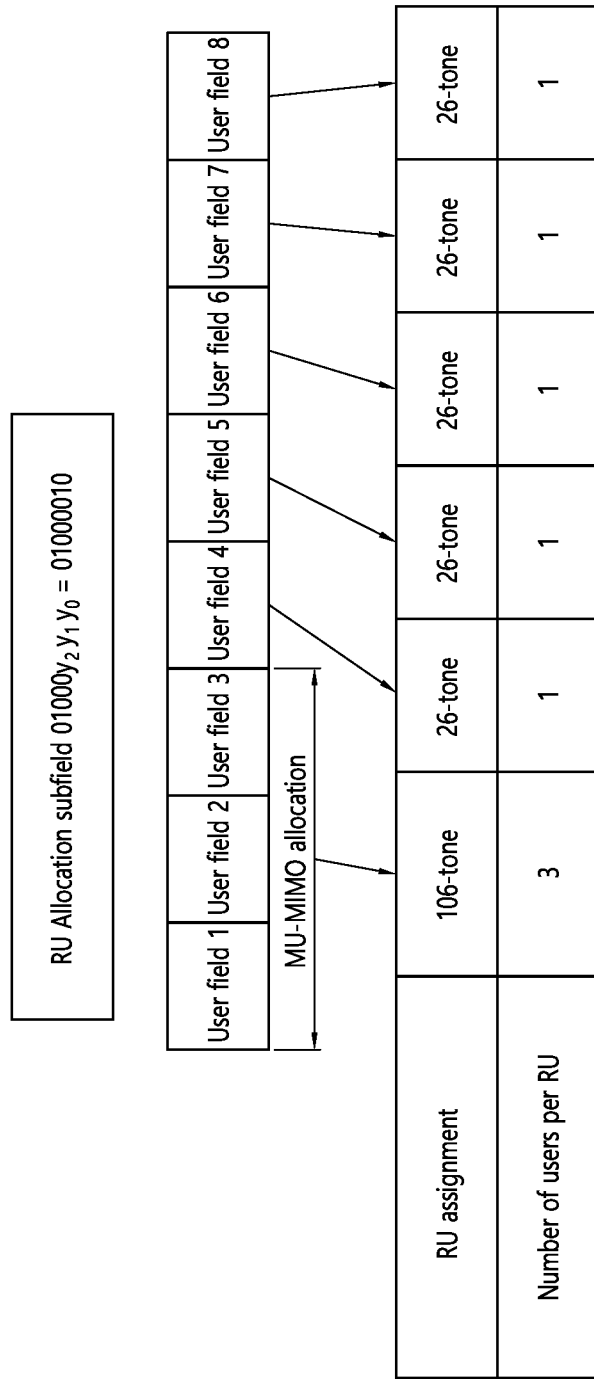
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.).

TABLE 3

| $N_{user}$ | B3 . . . B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 . . . B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA.

In addition, a second bit (e.g., B11-B13) in the user field of the second format may include information related to the number of spatial streams applied to a corresponding RU. In addition, a third bit (e.g., B14) in the user field of the second format may include information related to whether a beam-forming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
FIG. 10 illustrates an operation based on UL-MU.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | | 106 | | | 1 |
| 17 | 26 | 26 | 52 | | 26 | | 106 | | | 1 |
| 18 | 52 | | 26 | 26 | 26 | | 106 | | | 1 |
| 19 | 52 | | 52 | | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | 52 | | 52 | | 1 |
| 25 | 242-tone RU empty (with zero users) | | | | | | | | | 1 |
| 26 | | 106 | | | | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | 52 + 26 | | 26 | | 1 |
| 60 | 26 | 26 + 52 | | 26 | 26 | 26 | 26 | 26 | | 1 |
| 61 | 26 | 26 + 52 | | 26 | 26 | 26 | 52 | | | 1 |
| 62 | 26 | 26 + 52 | | 26 | 52 | | 26 | 26 | | 1 |
| 63 | 26 | 26 | 52 | | 26 | 52 + 26 | | 26 | | 1 |
| 64 | 26 | 26 + 52 | | 26 | 52 + 26 | | 26 | | | 1 |
| 65 | 26 | 26 + 52 | | 26 | 52 | | 52 | | | 1 |

TABLE 7

| | | | | | | | |
|---|---|---|---|---|---|---|---|
| 66 | 52 | | 26 | 26 | 26 | 52 + 26 | 26 | 1 |
| 67 | 52 | | | 52 | 26 | 52 + 26 | 26 | 1 |
| 68 | 52 | | | 52 + 26 | | 52 | 52 | 1 |
| 69 | 26 | 26 | 26 | 26 | | 26 + 106 | | 1 |
| 70 | 26 | | 26 + 52 | | 26 | 106 | | 1 |
| 71 | 26 | 26 | | 52 | | 26 + 106 | | 1 |
| 72 | 26 | | 26 + 52 | | | 26 + 106 | | 1 |
| 73 | 52 | | 26 | 26 | | 26 + 106 | | 1 |
| 74 | 52 | | | 52 | | 26 + 106 | | 1 |
| 75 | | 106 + 26 | | | | 26 | 26 | 26 | 26 | 1 |
| 76 | | 106 + 26 | | | | 26 | 26 | 52 | | 1 |
| 77 | | 106 + 26 | | | | 52 | | 26 | 26 | 1 |
| 78 | | 106 | | | 26 | 52 + 26 | | 26 | 1 |
| 79 | | 106 + 26 | | | | 52 + 26 | | 26 | 1 |
| 80 | | 106 + 26 | | | | 52 | | 52 | 1 |
| 81 | | 106 + 26 | | | | | 106 | | 1 |
| 82 | | 106 | | | | 26 + 106 | | | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
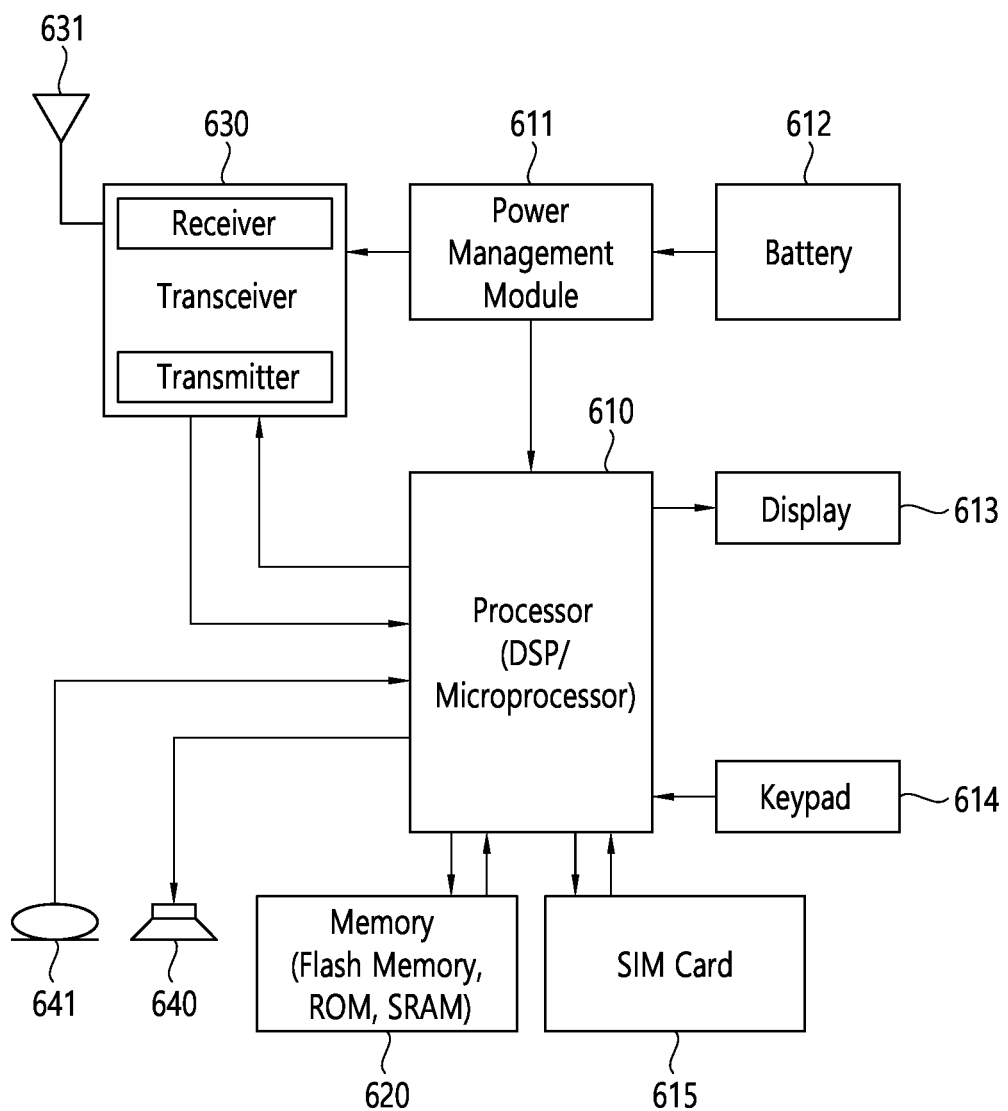
FIG. 11 illustrates a modified example of a transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. HE-SIG-B Content Channels

The HE-SIG-B field of the 20 MHz HE MU PPDU includes one HE-SIG-B content channel. The HE-SIG-B field of the HE MU PPDU of a band of 40 MHz or larger includes two HE-SIG-B content channels.

The HE-SIG-B content channel has already been shown in FIG. 8.

Figure 12:
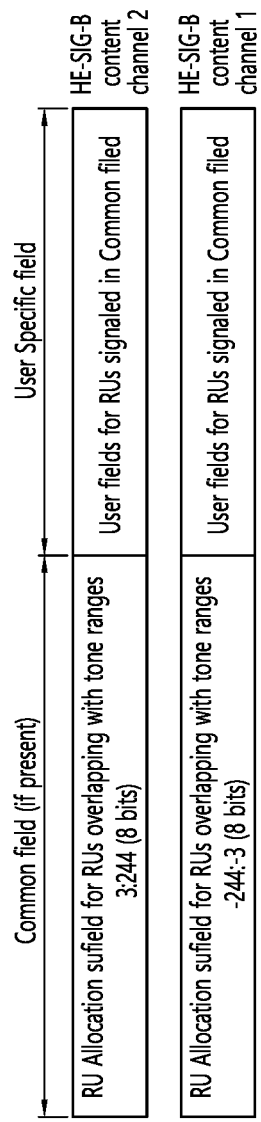
FIG. 12 shows an example of a HE-SIG-B content channel for a 40 MHz PPDU.

FIG. 12 shows an example of a HE-SIG-B content channel for a 40 MHz PPDU.

Referring to FIG. 12, a 40 MHz PPDU includes two HE-SIG-B content channels each occupying a 20 MHz frequency segment. HE-SIG-B content channel 1 occupies a low frequency 20 MHz frequency subchannel (or segment), and HE-SIG-B content channel 2 occupies a high frequency 20 MHz frequency subchannel.

Figure 13:
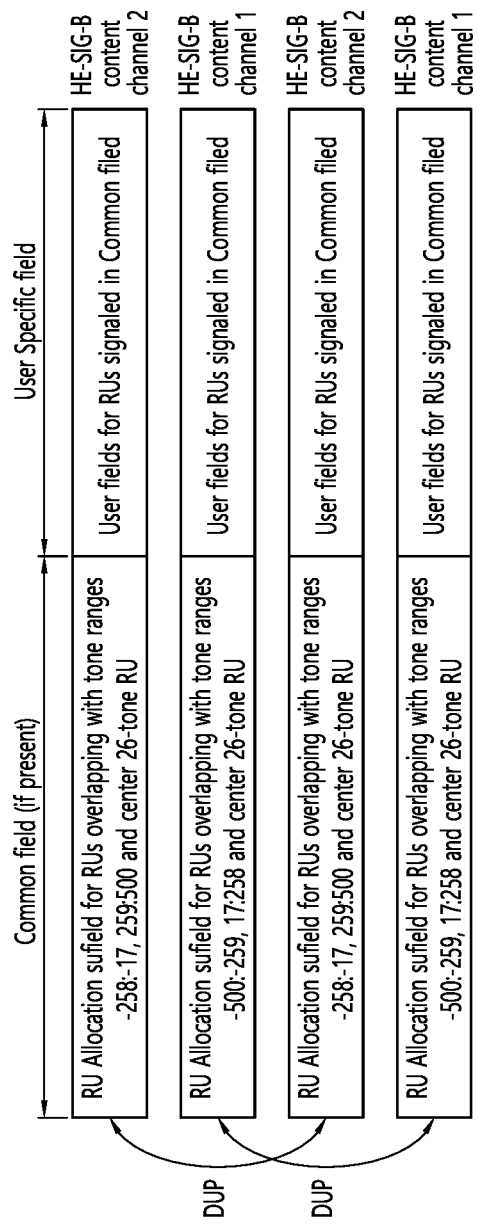
FIG. 13 shows an example of a HE-SIG-B content channel for an 80 MHz PPDU.

FIG. 13 shows an example of a HE-SIG-B content channel for an 80 MHz PPDU.

Referring to FIG. 13, an 80 MHz PPDU includes two HE-SIG-B content channels that are each duplicated once. HE-SIG-B content channel 1 occupies the 20 MHz frequency subchannel having the lowest frequency and is duplicated in the 20 MHz frequency subchannel having the third lowest frequency. HE-SIG-B content channel 2 occupies the 20 MHz frequency subchannel with the second lowest frequency and is duplicated in the 20 MHz frequency subchannel with the highest frequency.

Figure 14:
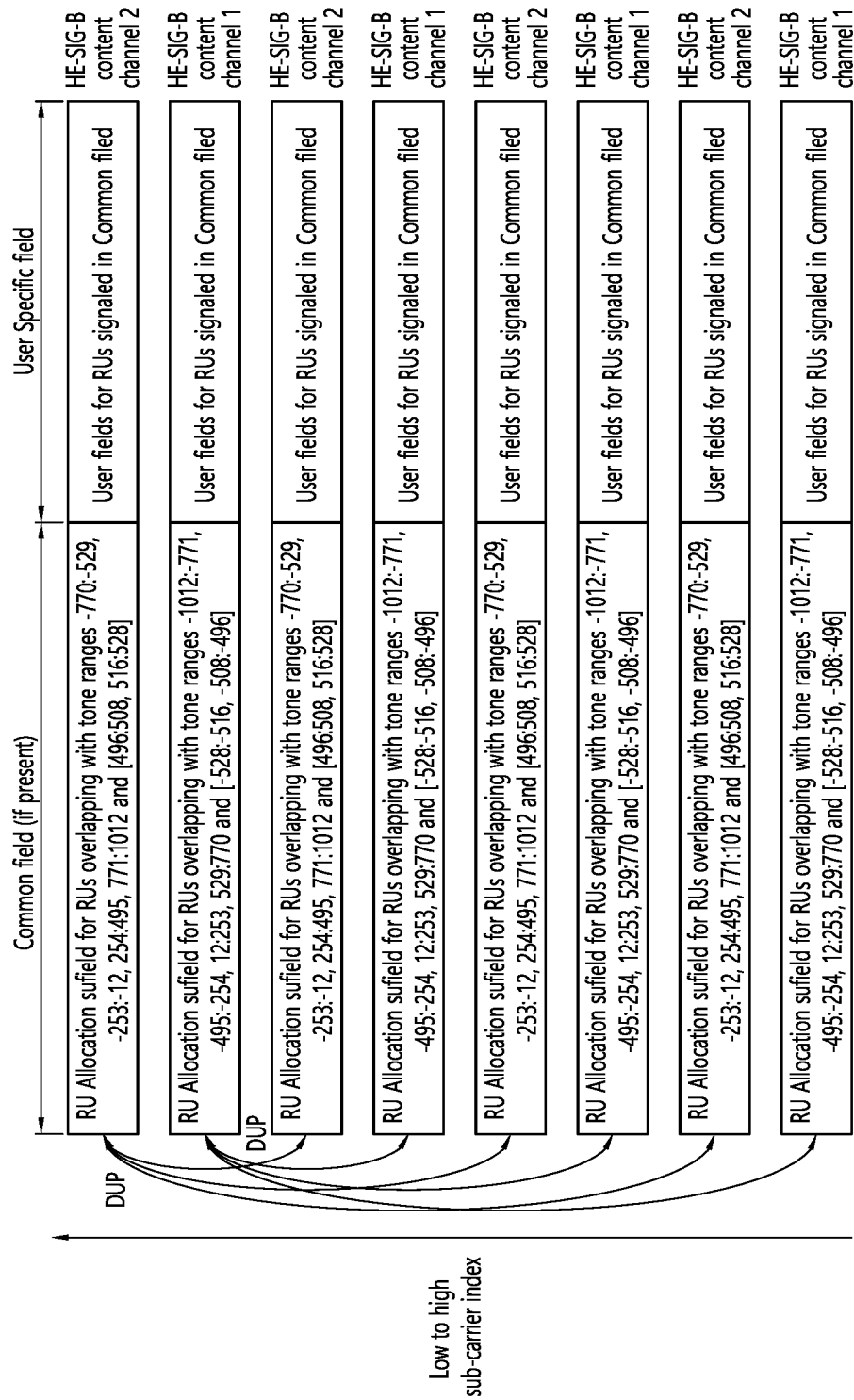
FIG. 14 shows an example of a HE-SIG-B content channel for a 160 MHz PPDU.

FIG. 14 shows an example of a HE-SIG-B content channel for a 160 MHz PPDU.

Referring to FIG. 14, the 160 MHz PPDU includes two HE-SIG-B content channels that are each duplicated four times. HE-SIG-B content channel 1 occupies the lowest 20 MHz frequency subchannel and is duplicated in the third, fifth, and seventh lowest 20 MHz frequency subchannels. HE-SIG-B content channel 2 occupies the 20 MHz frequency subchannel with the second lowest frequency and is duplicated in the fourth, sixth, and eighth lowest 20 MHz frequency subchannels.

2. Examples Applicable to the Present Specification

In 802.11be, various preamble puncturing or multiple RU allocation is considered in broadband (up to 320 MHz) and SU/MU transmission. In order to support a STA having low end capability (i.e., an 80 MHz only operating STA), a signal transmission/reception method through 80 MHz segment allocation is being considered. Therefore, this specification proposes a method for configuring an EHT-SIG and a transmission method for the MU transmission in consideration of subchannel selective transmission (SST) and Multi-RU aggregation defined in 802.11ax.

An 802.11be MU-PPDU for transmitting a signal to multiple STAs in consideration of backward compatibility may be configured as shown in FIG. 10.

The U-SIG includes a version independent field and a version dependent field as described above.

The version independent field may include a 3-bit version identifier indicating a Wi-Fi version after 802.11be and 802.11be and a 1-bit DL/UL field, BSS color, TXOP duration, etc., and the version dependent field may include information such as PPDU format type, Bandwidth, and MCS.

In U-SIG, two symbols are jointly encoded, and U-SIG consists of 52 data tones and 4 pilot tones for each 20 MHz. Also, U-SIG is modulated in the same way as 802.11ax HE-SIG-A. That is, the U-SIG is modulated with a BPSK 1/2 code rate.

EHT-SIG can be divided into common field and user specific field and can be encoded with variable MCS. The common field may indicate information of a spatial stream and RU used, and the user specific field may indicate information of information ID, MCS, and coding used for a specific user or STA.

In 802.11be, the following small or large size RU aggregation may be considered during OFDMA transmission. In the embodiment of the present specification, considering the primary 20 MHz channel (P20), at this time, it is assumed that P20 is the lowest 20 MHz in terms of frequency and P20 is the first 20 MHz channel (ch1) within 80 MHz [ch1 ch2 ch3 ch4]. The pattern may vary depending on the location of the primary channel.

In 802.11be, the following RU aggregation can be considered.

2.1. Small Size of RU Aggregation

FIG. 15 shows an example of 26+52RU configured by aggregation of small size RUs.

Referring to FIG. 15, it can be seen that there are 11 26+52RU cases in a specific 20 MHz channel.

FIG. 16 shows an example of 26+106 RU configured by aggregation of small size RUs.

Referring to FIG. 16, it can be seen that there are 10 cases of 26+106RU in a specific 20 MHz channel.

FIG. 17 shows an example of 26+52RU and 26+106RU configured by aggregation of small size RUs.

Referring to FIG. 17, it can be seen that there are cases in which two types of small RU aggregations (26+52RU and 26+106RU) are considered in a specific 20 MHz channel.

2.2. Large Size of RU Aggregation

FIG. 18 shows an example of 242+484RU configured by an aggregation of large size RUs.

Referring to FIG. 18, it can be seen that there are four cases of 242+484RU in the 80 MHz band.

FIG. 19 shows an example of 484+996RU configured by an aggregation of large size RUs.

Referring to FIG. 19, it can be seen that there are four 484+996RU cases in the 160 MHz band.

In addition, the large size RU may include the case of 3×996RU in the 320 MHz band.

2.3. Method for Configuring RU Allocation to Indicate MRU

RU allocation information may be configured including allocation for multiple RU aggregation as described above. In addition, the number of Multi User-Multi Input Multi Output (MU-MIMO) users is supported up to 8, and considering the RU size applying MU-MIMO to 242RU or more, the RU allocation subfield can be configured of 8 bits as in the existing 802.11ax as follows.

2.3.1. The RU allocation field for 802.11be OFDMA transmission consists of 8 bits.

2.3.2. At this time, in order to determine whether or not allocation is for multiple RU aggregation, 1 bit of Most Significant Bit (MSB) is used in the 8-bit RU allocation field.

A. At this time, MSB 1 bit can be used as follows.

i. When the MSB 1 bit of RU allocation bit is set to 0

1) The allocation information for RU allocation indicates general RU allocation that does not include information on multiple RU aggregation.

ii. When the MSB 1 bit of RU allocation bit is set to 1

1) RU allocation information indicates RU allocation for Multiple RU aggregation.

B. As described above, by using MSB 1 bit of the RU allocation bit, the STA can quickly determine whether information on the allocated RU is MRU aggregation.

The following information is an example of RU allocation information including allocation information for a single-RU (SRU) when the MSB is set to 0.

| MSB 1 bit B7 | 7 bit information (B6 B5 B4 B3 B2 B1 B0) | #1 | #2 | #3 | #4 | #5 | #6 | #7 | #8 | #9 | Number of entries |
|---|---|---|---|---|---|---|---|---|---|---|---|
| 0 | 0000000 | 26 | 26 | 26 | 26 | 26 | 26 | 26 | 26 | 26 | 1 |
| 0 | 0000001 | 26 | 26 | 26 | 26 | 26 | 26 | 26 | 52 | | 1 |
| 0 | 0000010 | 26 | 26 | 26 | 26 | 26 | 52 | | 26 | 26 | 1 |
| 0 | 0000011 | 26 | 26 | 26 | 26 | 26 | 52 | | 52 | | 1 |
| 0 | 0000100 | 26 | 26 | 52 | | 26 | 26 | 26 | 26 | 26 | 1 |
| 0 | 0000101 | 26 | 26 | 52 | | 26 | 26 | 26 | 52 | | 1 |
| 0 | 0000110 | 26 | 26 | 52 | | 26 | 52 | | 26 | 26 | 1 |
| 0 | 0000111 | 26 | 26 | 52 | | 26 | 52 | | 52 | | 1 |
| 0 | 0001000 | 52 | | 26 | 26 | 26 | 26 | 26 | 26 | 26 | 1 |

-continued

| MSB 1 bit B7 | 7 bit information (B6 B5 B4 B3 B2 B1 B0) | #1 | #2 | #3 | #4 | #5 | #6 | #7 | #8 | #9 | Number of entries |
|---|---|---|---|---|---|---|---|---|---|---|---|
| 0 | 0001001 | 52 | | 26 | 26 | 26 | 26 | 26 | | 52 | 1 |
| 0 | 0001010 | 52 | | 26 | 26 | 26 | 52 | | 26 | 26 | 1 |
| 0 | 0001011 | 52 | | 26 | 26 | | 52 | | 52 | | 1 |
| 0 | 0001100 | 52 | | 52 | | 26 | 26 | 26 | 26 | 26 | 1 |
| 0 | 0001101 | 52 | | 52 | | 26 | 26 | 26 | | 52 | 1 |
| 0 | 0001110 | 52 | | 52 | | 26 | 52 | | 26 | 26 | 1 |
| 0 | 0001111 | 52 | | 52 | | 26 | 52 | | 52 | | 1 |
| 0 | 0010000 | 52 | | 52 | | — | | 106 | | | 1 |
| 0 | 0010001 | | 106 | | | — | 52 | | 52 | | 1 |
| 0 | 0010010 | 26 | 26 | 26 | 26 | 26 | | 106 | | | 1 |
| 0 | 0010011 | 26 | 26 | | 52 | 26 | | 106 | | | 1 |
| 0 | 0010100 | 52 | | 26 | 26 | 26 | | 106 | | | 1 |
| 0 | 0010101 | 52 | | | 52 | 26 | | 106 | | | 1 |
| 0 | 0010110 | | 106 | | | 26 | 26 | 26 | 26 | 26 | 1 |
| 0 | 0010111 | | 106 | | | 26 | 26 | 26 | | 52 | 1 |
| 0 | 0011000 | | 106 | | | 26 | 52 | | 26 | 26 | 1 |
| 0 | 0011001 | | 106 | | | 26 | 52 | | 52 | | 1 |
| 0 | 0011010 | | 106 | | | — | | 106 | | | 1 |
| 0 | 0011011 | 52 | | 52 | | — | 52 | | 52 | | 1 |
| 0 | 0011100 | | 106 | | 26 | | 106 | | | | 1 |
| 0 | 0011101 | 242-tone RU empty (with zero users) | | | | | | | | | 1 |
| 0 | 0011110 | 484-tone RU; contributes zero User fields to the User Specific field in the same HE-SIG-B content channel as this RU Allocation subfield | | | | | | | | | 1 |
| 0 | 0011111 | 996-tone RU; contributes zero User fields to the User Specific field in the same HE-SIG-B content channel as this RU Allocation subfield | | | | | | | | | 1 |
| 0 | 0100000 | 2 × 996-tone RU; contributes zero User fields to the User Specific field in the same HE-SIG-B content channel as this RU Allocation subfield | | | | | | | | | 1 |
| 0 | 0100001 | 3 × 996-tone RU; contributes zero User fields to the User Specific field in the same HE-SIG-B content channel as this RU Allocation subfield | | | | | | | | | 1 |
| 0 | 010001x1 | reserved | | | | | | | | | 2 |
| 0 | 01001x1x2 | reserved | | | | | | | | | 4 |
| 0 | 0101y1y2y3 | 242 | | | | | | | | | 8 |
| 0 | 0110y1y2y3 | 484 | | | | | | | | | 8 |
| 0 | 0111y1y2y3 | 996 | | | | | | | | | 8 |
| 0 | 1000y1y2y3 | 2 × 996 | | | | | | | | | 8 |
| 0 | 1001y1y2y3 | 3 × 996 | | | | | | | | | 8 |
| 0 | 101x1x2x3x4 | reserved | | | | | | | | | 16 |
| 0 | 11x1x2x3x4x5 | reserved | | | | | | | | | 32 |

The following information is an example of RU allocation information including allocation information for multiple-RU (MRU) when MSB is set to 1.

| | | | | | | | | | | |
|---|---|---|---|---|---|---|---|---|---|---|
| 1 | 0000000 | 26 | | 26 + 52 | | 26 | 26 | 26 | 26 | 26 | 1 |
| 1 | 0000001 | 26 | | 26 + 52 | | 26 | 26 | 26 | | 52 | 1 |
| 1 | 0000010 | 26 | | 26 + 52 | | 26 | 52 | | 26 | 26 | 1 |
| 1 | 0000011 | 26 | | 26 + 52 | | 26 | 52 | | 52 | | 1 |
| 1 | 0000100 | 26 | 26 | 26 | 26 | 26 | 52 + 26 | | | 26 | 1 |
| 1 | 0000101 | 26 | 26 | | 52 | 26 | 52 + 26 | | | 26 | 1 |
| 1 | 0000110 | | 52 | | 26 | 26 | 52 + 26 | | | 26 | 1 |
| 1 | 0000111 | 52 | | 52 | | 26 | 52 + 26 | | | 26 | 1 |
| 1 | 0001000 | 26 | | 26 + 52 | | 26 | 52 + 26 | | | 26 | 1 |
| 1 | 0001001 | 26 | | 26 + 52 | | 26 | | 106 | | | 1 |
| 1 | 0001010 | | 106 | | | 26 | 52 + 26 | | | 26 | 1 |
| 1 | 0001011 | 26 | 26 | 26 | 26 | | 26 + 106 | | | | 1 |
| 1 | 0001100 | 26 | 26 | | 52 | | 26 + 106 | | | | 1 |
| 1 | 0001101 | | 52 | | 26 | 26 | 26 + 106 | | | | 1 |
| 1 | 0001110 | 52 | | 52 | | | 26 + 106 | | | | 1 |
| 1 | 0001111 | | 106 + 26 | | | 26 | 26 | 26 | 26 | | 1 |
| 1 | 0010000 | | 106 + 26 | | | 26 | 26 | | 52 | | 1 |
| 1 | 0010001 | | 106 + 26 | | | 52 | | 26 | 26 | | 1 |
| 1 | 0010010 | | 106 + 26 | | | 52 | | 52 | | | 1 |
| 1 | 0010011 | | 106 + 26 | | | 52 + 26 | | | 26 | | 1 |
| 1 | 0010100 | 26 | | 26 + 52 | | | 26 + 106 | | | | 1 |
| 1 | 0010101 | Reserved | | | | | | | | | 1 |
| 1 | 001011x1 | Reserved | | | | | | | | | 2 |
| 1 | 0011y1y2y3 | 242(1) + 484(2), second 242 is not allocated in 80 MHz | | | | | | | | | 8 |
| 1 | 0100y1y2y3 | 242(2) + 484(2), first 242 is not allocated in 80 MHz | | | | | | | | | 8 |
| 1 | 0101y1y2y3 | 484(1) + 242(4), third 242 is not allocated in 80 MHz | | | | | | | | | 8 |
| 1 | 0110y1y2y3 | 484(1) + 242(3), forth 242 is not allocated in 80 MHz | | | | | | | | | 8 |
| 1 | 0111y1y2y3 | 484(1) + 996(2), second 484 is not allocated in 160 MHz | | | | | | | | | 8 |
| 1 | 1000y1y2y3 | 484(2) + 996(2), first 484 is not allocated in 160 MHz | | | | | | | | | 8 |

-continued

| 1 | 1001y1y2y3 | 996(1) + 484(4), third 484 is not allocated in 160 MHz | 8 |
| 1 | 1010y1y2y3 | 996(1) + 484(3), forth 484 is not allocated in 160 MHz | 8 |
| 1 | 1011y1y2y3 | 996(1) + 996(3) + 996(4), second 996 is not allocated in 320 MHz | 8 |
| 1 | 1100y1y2y3 | 996(1) + 996(2) + 996(4), third 996 is not allocated in 320 MHz | 8 |
| 1 | 1101y1y2y3 | 996(1) + 996(2) + 996(3), fourth 996 is not allocated in 320 MHz | 8 |
| 1 | 1110y1y2y3 | 996(2) + 996(3) + 996(4), first 996 is not allocated in 320 MHz | 8 |
| 1 | 1111y1y2y3 | Reserved | 8 | i. In the SRU allocation information and MRU allocation information, "2×996-tone RU; contributes zero User fields to the User Specific field in the same HE-SIG-B content channel as this RU Allocation subfield" and "3×996-tone RU; contributes zero User fields to the User Specific field in the same HE-SIG-B content channel as this RU Allocation subfield" may not be included.

ii. The 2×996-tone RU and 3×996-tone RU indicators of the SRU allocation information and the MRU allocation information are not used when full bandwidth MIMO or a common field exists at 160 MHz and 240 MHz.

iii. In the case of 242+484RU in the MRU allocation information, since it is possible to indicate possible combinations through two content channels within 80 MHz, the MRU allocation information may indicate one case including 8 entries.

iv. The RU allocation information included in the SRU allocation information and the MRU allocation information is only an example, and the content of the information on the corresponding bit may be changed, and the entry included in the table may also be changed.

v. Among the RU allocation information, allocation information for 4×996 may be included in the SRU allocation information.

vi. The bit ordering is only one embodiment, and the bit order for the allocated RU allocation may be different.

vii. By configuring the RU allocation with 8 bits as described above, signaling overhead for the MRU indicator can be reduced.

viii. The 8-bit table is an embodiment, and RU allocation information can be configured with 8 bits including information on both SRU and MRU allocation without an SRU/MRU parsing bit.

2.3.3. Unlike the above, in consideration of more MRU aggregation, the RU allocation information may consist of 9 bits.

A. The RU allocation (RA) information may further include an MRU combination consisting of 484 tone+2×996 tone at 240 MHz and an MRU combination consisting of 484 tone+3×996 tone at 320 MHz.

B. Considering the above combination and the number of users of MU-MIMO, it may be configured as follows.

| MSB (1 bit) B8 | 8 bit information (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|---|
| 0 | 00000000 | 26 | 26 | 26 | 26 | 26 | 26 | 26 | 26 | 26 | 1 |
| 0 | 00000001 | 26 | 26 | 26 | 26 | 26 | 26 | 26 | 52 | | 1 |
| 0 | 00000010 | 26 | 26 | 26 | 26 | 26 | 52 | 26 | 26 | | 1 |
| 0 | 00000011 | 26 | 26 | 26 | 26 | 26 | 52 | 52 | | | 1 |
| 0 | 00000100 | 26 | 26 | 52 | 26 | 26 | 26 | 26 | 26 | | 1 |
| 0 | 00000101 | 26 | 26 | 52 | 26 | 26 | 26 | 52 | | | 1 |
| 0 | 00000110 | 26 | 26 | 52 | 26 | 52 | 26 | 26 | | | 1 |
| 0 | 00000111 | 26 | 26 | 52 | 26 | 52 | 52 | | | | 1 |
| 0 | 00001000 | 52 | 26 | 26 | 26 | 26 | 26 | 26 | | | 1 |
| 0 | 00001001 | 52 | 26 | 26 | 26 | 26 | 26 | 52 | | | 1 |
| 0 | 00001010 | 52 | 26 | 26 | 26 | 52 | 26 | 26 | | | 1 |
| 0 | 00001011 | 52 | 26 | 26 | 26 | 52 | 52 | | | | 1 |
| 0 | 00001100 | 52 | 52 | 26 | 26 | 26 | 26 | | | | 1 |
| 0 | 00001101 | 52 | 52 | 26 | 26 | 26 | 52 | | | | 1 |
| 0 | 00001110 | 52 | 52 | 26 | 52 | 26 | 26 | | | | 1 |
| 0 | 00001111 | 52 | 52 | 26 | 52 | 52 | | | | | 1 |
| 0 | 00010000 | 52 | 52 | — | 106 | | | | | | 1 |
| 0 | 00010001 | 106 | | — | 52 | 52 | | | | | 1 |
| 0 | 00010010 | 26 | 26 | 26 | 26 | 26 | 106 | | | | 1 |
| 0 | 00010011 | 26 | 26 | 52 | 26 | 106 | | | | | 1 |
| 0 | 00010100 | 52 | 26 | 26 | 26 | 106 | | | | | 1 |
| 0 | 00010101 | 52 | 52 | 26 | 106 | | | | | | 1 |
| 0 | 00010110 | 106 | 26 | 26 | 26 | 26 | | | | | 1 |
| 0 | 00010111 | 106 | 26 | 26 | 26 | 52 | | | | | 1 |
| 0 | 00011000 | 106 | 26 | 52 | 26 | 26 | | | | | 1 |
| 0 | 00011001 | 106 | 26 | 52 | 52 | | | | | | 1 |
| 0 | 00011010 | 106 | — | 106 | | | | | | | 1 |
| 0 | 00011011 | 52 | 52 | — | 52 | 52 | | | | | 1 |
| 0 | 00011100 | 106 | 26 | 106 | | | | | | | 1 |
| 0 | 00011101 | 242-tone RU empty (with zero users) | | | | | | | | | 1 |
| u | 00011110 | 484-tone RU; contributes zero User fields to the User Specific field in the same HE-SIG-B content channel as this RU Allocation subfield | | | | | | | | | 1 |
| 0 | 00011111 | 996-tone RU; contributes zero User fields to the User Specific field in the same HE-SIG-B content channel as this RU Allocation subfield | | | | | | | | | 1 |
| 0 | 00100000 | 2 × 996-tone RU; contributes zero User fields to the User Specific field in the same HE-SIG-B content channel as this RU Allocation subfield | | | | | | | | | 1 |

-continued

| MSB (1 bit) B8 | 8 bit information (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|---|
| 0 | 00100001 | 3 × 996-tone RU; contributes zero User fields to the User Specific field in the same HE-SIG-B content channel as this RU Allocation subfield | | | | | | | | | 1 |
| 0 | 0010001x0 | Reserved | | | | | | | | | 2 |
| 0 | 001001x1x0 | Reserved | | | | | | | | | 4 |
| 0 | 00101y2y1y0 | 242 | | | | | | | | | 8 |
| 0 | 00110y2y1y0 | 484 | | | | | | | | | 8 |
| 0 | 00111y2y1y0 | 996 | | | | | | | | | 8 |
| 0 | 01000y2y1y0 | 2 × 996 | | | | | | | | | 8 |
| 0 | 01001y2y1y0 | 3 × 996 | | | | | | | | | 8 |
| 0 | 0101y3y2y1y0 | Reserved | | | | | | | | | 16 |
| 0 | 011y4y3y2y1y0 | Reserved | | | | | | | | | 32 |
| 0 | 1y6y5y4y3y2y1y0 | Reserved | | | | | | | | | 128 |

| MSB (1 bit) B8 | 8 bit information (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|---|
| 1 | 00000000 | 26 | 26 + 52 | 26 | 26 | 26 | 26 | 26 | | | 1 |
| 1 | 00000001 | 26 | 26 + 52 | 26 | 26 | 26 | | | | | 1 |
| 1 | 00000010 | 26 | 26 + 52 | 26 | 52 | 26 | 26 | | | | 1 |
| 1 | 00000011 | 26 | 26 + 52 | 26 | 52 | | 52 | | | | 1 |
| 1 | 00000100 | 26 | 26 | 26 | 26 | 26 | 52 + 26 | 26 | | | 1 |
| 1 | 00000101 | 26 | 26 | 52 | 26 | 52 + 26 | 26 | | | | 1 |
| 1 | 00000110 | 52 | | 26 | 26 | 26 | 52 + 26 | 26 | | | 1 |
| 1 | 00000111 | 52 | | 52 | | 26 | 52 + 26 | 26 | | | 1 |
| 1 | 00001000 | 26 | 26 + 52 | | 76 | 52 + 26 | 26 | | | | 1 |
| 1 | 00001001 | 26 | 26 + 52 | 26 | 106 | | | | | | 1 |
| 1 | 00001010 | | 106 | 26 | 52 + 26 | 26 | | | | | 1 |
| 1 | 00001011 | 26 | 26 | 26 | 26 | 26 + 106 | | | | | 1 |
| 1 | 00001100 | 26 | 26 | 52 | 26 + 106 | | | | | | 1 |
| 1 | 00001101 | 52 | | 26 | 26 | 26 + 106 | | | | | 1 |
| 1 | 00001110 | 52 | | 52 | 26 + 106 | | | | | | 1 |
| 1 | 00001111 | | 106 | | 106 + 26 | | | | | | 1 |
| 1 | 00010000 | 106 + 26 | | | 26 | 26 | 26 | 26 | | | 1 |
| 1 | 00010001 | 106 + 26 | | | 26 | 26 | 52 | | | | 1 |
| 1 | 00010010 | 106 + 26 | | | 52 | | 26 | 26 | | | 1 |
| 1 | 00010011 | 106 + 26 | | | 52 | | 52 | | | | 1 |
| 1 | 00010100 | 106 + 26 | | | 106 | | | | | | 1 |
| 1 | 00010101 | 106 + 26 | | | 52 + 26 | 26 | | | | | 1 |
| 1 | 00010110 | 26 | 26 + 52 | | 26 + 106 | | | | | | 1 |
| 1 | 00010111 | Reserved | | | | | | | | | 1 |
| 1 | 00011 y2y1y0 | 242 + 484 | | | | | | | | | 8 |
| 1 | 00100 y2y1y0 | 484(1) + 996(2) | | | | | | | | | 8 |
| 1 | 00101 y2y1y0 | 484(2) + 996(2) | | | | | | | | | 8 |
| 1 | 00110 y2y1y0 | 996(1) + 484(4) | | | | | | | | | 8 |
| 1 | 00111 y2y1y0 | 996(1) + 484(3) | | | | | | | | | 8 |
| 1 | 01000 y2y1y0 | 484(1) + 996(2) + 996(3) | | | | | | | | | 8 |
| 1 | 01001 y2y1y0 | 484(2) + 996(2) + 996(3) | | | | | | | | | 8 |
| 1 | 01010 y2y1y0 | 996(1) + 484(3) + 996(3) | | | | | | | | | 8 |
| 1 | 01011 y2y1y0 | 996(1) + 484(4) + 996(3) | | | | | | | | | 8 |
| 1 | 01100 y2y1y0 | 996(1) + 996(2) + 484(5) | | | | | | | | | 8 |
| 1 | 01101 y2y1y0 | 996(1) + 996(2) + 484(6) | | | | | | | | | 8 |
| 1 | 01110 y2y1y0 | 996(1) + 996(2) + 996(3) | | | | | | | | | 8 |
| 1 | 01111 y2y1y0 | 996(1) + 996(2) + 996(4) | | | | | | | | | 8 |
| 1 | 10000 y2y1y0 | 996(1) + 996(3) + 996(4) | | | | | | | | | 8 |
| 1 | 10001 y2y1y0 | 996(2) + 996(3) + 996(4) | | | | | | | | | 8 |
| 1 | 10010 y2y1y0 | 484(1) + 996(2) + 996(3) + 996(4) | | | | | | | | | 8 |
| 1 | 10011 y2y1y0 | 484(2) + 996(2) + 996(3) + 996(4) | | | | | | | | | 8 |
| 1 | 10100 y2y1y0 | 996(1) + 484(3) + 996(3) + 996(4) | | | | | | | | | 8 |
| 1 | 10101 y2y1y0 | 996(1) + 484(4) + 996(3) + 996(4) | | | | | | | | | 8 |
| 1 | 10110 y2y1y0 | 996(1) + 996(2) + 484(5) + 996(4) | | | | | | | | | 8 |
| 1 | 10111 y2y1y0 | 996(1) + 996(2) + 484(6) + 996(4) | | | | | | | | | 8 |
| 1 | 11000 y2y1y0 | 996(1) + 996(2) + 996(3) + 484(7) | | | | | | | | | 8 |
| 1 | 11001 y2y1y0 | 996(1) + 996(2) + 996(3) + 484(8) | | | | | | | | | 8 |
| 1 | 1101 y3y2y1y0 | Reserved | | | | | | | | | 16 |
| 1 | 1110 y3y2y1y0 | Reserved | | | | | | | | | 16 |
| 1 | 1111 y3y2y1y0 | Reserved | | | | | | | | | 16 | i. As in 2.3.2., MSB 1 bit can be used to distinguish between single RU (SRU) and multiple RU (MRU).

ii. In the case of 242+484 RU as in the RA information, since it is possible to indicate possible combinations through two content channels within 80 MHz, the RA information may indicate one case including 8 entries.

iii. In the case of 3×996 RU, when channelization for 240 MHz is not formed, that is, when puncturing of 320 MHz is formed, it may be omitted from the RA information.

iv. As in the RA information, the total number of entries for the SRU and the MRU is different. In this case, 7 bits and 9 bits are required to indicate the SRU and the MRU, respectively. Therefore, unlike the RA information, the SRU may be configured with 7 bits and the MRU may be configured with 9 bits. Also, in the RA information for the SRU, an indicator for MU-MIMO transmission may be included in the RA information for the MRU. In this case, the RA information for the SRU may be indicated by being configured of 6 bits.

2.3.4. Unlike the use of MSB 1 bit to distinguish the indicator for the SRU and the MRU in the above, the RA field may be configured as follows.

A. The RU allocation (RA) field consists of 8/9 bits.

B. In one RU allocation bit map, the RA field may be configured to use a specific combination of entries in the RA field according to the RU size or MRU.

C. The entry of RU allocation in the RA field may be indicated by using entries that exist in different positions that are distinguished from each other in the RA field based on the size of 242 RUs.

i. For example, in the case of configuring the RA field with 8 bits, the indication for RUs (including multiple RUs, 26+52, 26+106) having a smaller RU size than 242 tone RU uses a bit entry corresponding to 00xxxxxx/000xxxxx of the RA subfield.

1) Even in the small RU size indication, the RA field may be configured to use entries differentiated from each other according to SRUs or MRUs.

A. For example, SRU allocation may use 000xxxxx and MRU may use 00xxxxx.

ii. Conversely, an indication for one classification for more than 242 RUs is indicated using a bit entry corresponding to 01xxxxxx/1xxxxxx of the RA subfield.

1) For the Large RU size, for a separate indication for SRU and MRU, the SRU may be allocated by using 01xxxxx, and the MRU may be allocated by using 1xxxxxx.

iii. The RU allocation subfield configured as described above may be configured as follows, for example.

TABLE 8

| RU allocation bit index | RU aggregation | RU size |
|---|---|---|
| 000xxxxx | SRU | Small size (<242 tone) |
| 001xxxxx | MRU | |
| 01xxxxx | SRU | Large size (>=242 tones) |
| 10xxxxx | MRU | | iv. In the above, a specific part or specific entry of the RU allocation subfield used for allocation for specific RUs is just one example, and another entry area may be allocated and used.

1) As another example, RA can be configured as follows.

TABLE 9

| RU allocation bit index | RU aggregation | RU size |
|---|---|---|
| 0xxxxxxx-01xxxxxx | SRU and MRU | SRU (for all size) and MRU (<242 tones) |
| 1xxxxxxx | MRU | Large size (>=242 tones) | v. As described above, in order to use an indicator classified according to RU aggregation or RU size, a separate entry or entry group of the RA field may be allocated to indicate RU allocation.

vi. The RA field may be configured by allocating a separate RA field for a specific RU allocation for a hierarchical indication for RU allocation as described above.

2.3.5. The STA can decode only the SIG field transmitted through the allocated 80 MHz segment. However, as described above, since the RU allocation includes information on large RU aggregation, the STA can also identify information on the allocated RU included in another 80 MHz segment through the EHT-SIG content channel corresponding to the allocated 80 MHz segment. Therefore, unlike the existing 802.11ax, since the STA can grasp information on the RU included in an 80 MHz segment other than the allocated 80 MHz segment, the RU allocation subfield transmitted through the EHT-SIG content channel may be configured as follows.

A. 802.11be U-SIG and EHT-SIG can be configured differently in units of 80 MHz segment.

B. There are two EHT-SIG content channels per 80 MHz, and content channel (CC) 1 includes RU allocation information for the 1st and 3rd 20 MHz, CC 2 includes RU allocation information for 2nd and 4th 20 MHz within 80 MHz. Accordingly, in consideration of two content channels, the RU allocation subfield includes the RU allocation subfield for 20/40/80 MHz as follows.

i. 20 MHz

1) CC1: RU allocation subfield for 1st 20 MHz frequency segment

1) CC1: RU allocation subfield for 1st 20 MHz frequency segment

2) CC2: RU allocation subfield for 2st 20 MHz frequency segment

3) Configuration including one RU allocation subfield per CC iii. 80 MHz

1) CC1: RU allocation subfield for 1st 20 MHz frequency segment, RU allocation subfield for 3st 20 MHz frequency segment 2) CC2: RU allocation subfield for 2st 20 MHz frequency segment, RU allocation subfield for 4st 20 MHz frequency segment 3) Configuration including 2 RU allocation subfields per CC FIG. 20 shows an example of the arrangement of U-SIG and EHT-SIG in an 80 MHz PPDU.

Figure 20:
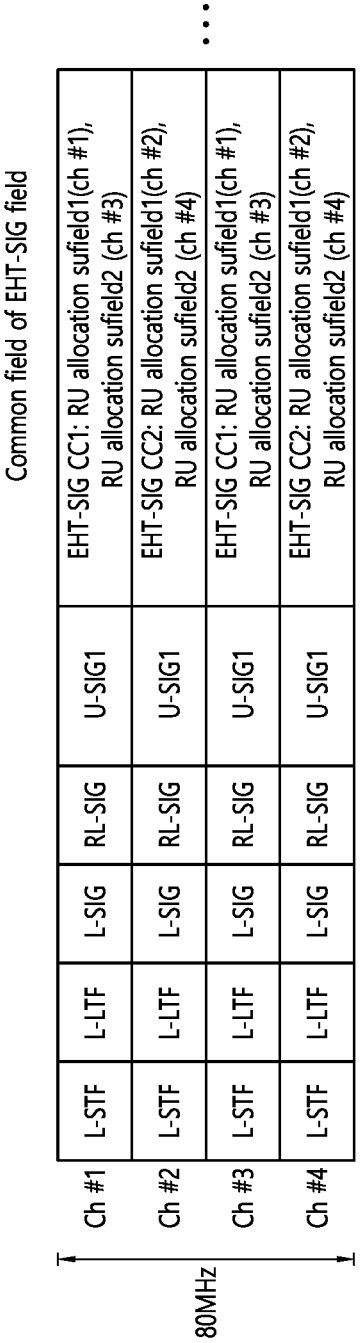
FIG. 20 shows an example of the arrangement of U-SIG and EHT-SIG in an 80 MHz PPDU.

Referring to FIG. 20, the STA may decode the U-SIG and the EHT-SIG in units of 80 MHz. That is, the STA may decode U-SIG1 in the 80 MHz band, and the U-SIG1 is configured and duplicated in units of 20 MHz, so that the same four U-SIG1s may be included in the 80 MHz PPDU.

In addition, the STA can decode EHT-SIG CC1 and EHT-SIG CC2 in the 80 MHz band, the EHT-SIG CC1 includes an RU allocation subfield for the first channel (ch #1) and an RU allocation subfield for the third channel (ch

3), and the EHT-SIG CC2 includes an RU allocation subfield for the second channel (ch #2) and an RU allocation subfield for the fourth channel (ch #4). The EHT-SIG CC1 for the third channel is duplicated with the EHT-SIG CC1 for the first channel, and the EHT-SIG CC2 for the fourth channel is duplicated with the EHT-SIG CC2 for the second channel.

2.3.6. When the STA is allocated to the 80 MHz segment, and the SIG receiving capability is 80 MHz or large size MRU aggregation is applied to transmit the MU-PPDU using the BW of 160 MHz or higher, the number of RU allocation subfields included in the EHT-SIG CC of the MU-PPDU may be fixed to two. That is, the STA can decode in the 80 MHz segment allocated for the control field, but if the STA's operating band also supports a broadband (160 MHz or more), data can be transmitted and received using the MRU included in the broadband.

A. The number of RU allocation subfields transmitted through CC per 80 MHz is two, and the first RU allocation subfield includes RU (or MRU) allocation information for the 1st and 3rd 20 MHz segments within the allocated 80 MHz. And the second RU allocation subfield includes RU (or MRU) allocation information for the 2nd and 4th 20 MHz segments within the allocated 80 MHz.

i. For example, in the case of 160 MHz, the EHT-SIG CC can be configured as follows.
1) first 80 MHz segment: Includes first 80 MHz segment allocation information and MRU allocation information
A. CC1: first RU allocation subfield, second RU allocation subfield, N=2, total bits for RU allocation=2*8 bits
B. CC2: first RU allocation subfield, second RU allocation subfield, N=2, total bits for RU allocation=2*8 bits
2) second 80 MHz segment: Includes second 80 MHz segment allocation information and MRU allocation information
A. CC1: first RU allocation subfield, second RU allocation subfield, N=2, total bits for RU allocation=2*8 bits
B. CC2: first RU allocation subfield, second RU allocation subfield, N=2, total bits for RU allocation=2*8 bits FIG. 21 shows an example of the arrangement of U-SIG and EHT-SIG in a 160 MHz PPDU.

Figure 21:
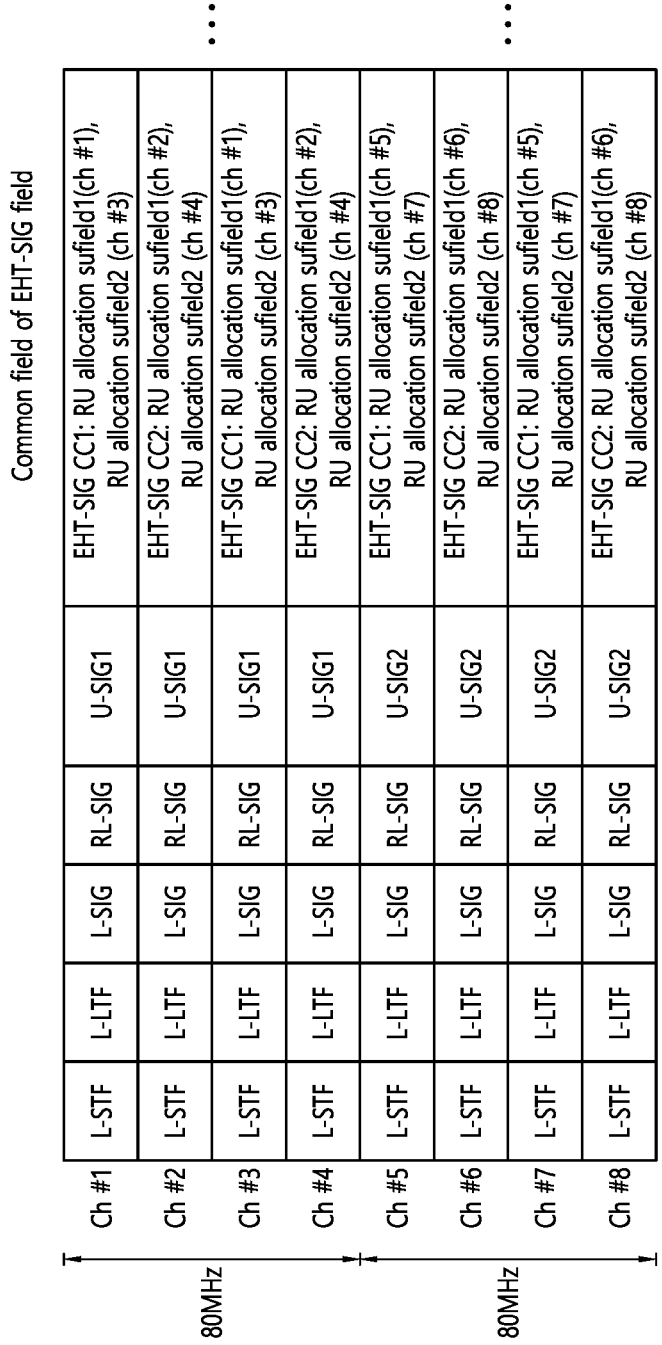
FIG. 21 shows an example of the arrangement of U-SIG and EHT-SIG in a 160 MHz PPDU.

Referring to FIG. 21, the STA may decode the U-SIG and the EHT-SIG in units of 80 MHz.

That is, the STA may decode U-SIG1 in the first 80 MHz segment and may decode U-SIG2 in the second 80 MHz segment. The U-SIG1 is configured and duplicated in units of 20 MHz, and the same four U-SIG1s may be included in the first 80 MHz segment. The U-SIG2 is configured and duplicated in units of 20 MHz, and the same four U-SIG2s may be included in the second 80 MHz segment.

In addition, the STA may decode EHT-SIG CC1 and EHT-SIG CC2 in units of 80 MHz. First, in the first 80 MHz segment, EHT-SIG CC1 includes an RU allocation subfield for the first channel (ch #1) and an RU allocation subfield for the third channel (ch #3), EHT-SIG CC2 includes an RU allocation subfield for the second channel (ch #2) and an RU allocation subfield for the fourth channel (ch #4). The EHT-SIG CC1 for the third channel is duplicated with the EHT-SIG CC1 for the first channel, and the EHT-SIG CC2 for the fourth channel is duplicated with the EHT-SIG CC2 for the second channel.

In the second 80 MHz segment, EHT-SIG CC1 includes a RU allocation subfield for the fifth channel (ch #5) and an RU allocation subfield for the seventh channel (ch #7), and EHT-SIG CC2 includes an RU allocation subfield for the sixth channel (ch #6) and an RU allocation subfield for the eighth channel (ch #8). The EHT-SIG CC1 for the seventh channel is duplicated with the EHT-SIG CC1 for the fifth channel, and the EHT-SIG CC2 for the eighth channel is duplicated with the EHT-SIG CC2 for the sixth channel.

ii. For Large size RU aggregation, MRU allocation is indicated through the RU allocation subfield of the EHT-SIG CC of the 80 MHz segment including the start RU of the corresponding aggregation.

1) Because the STA's preamble receiving capability is up to 80 MHz, during large size RU aggregation, the STA is always allocated to the 80 MHz segment including the start RU of the aggregation.

2) In MRU allocation, a user field is transmitted through the EHT-SIG CC including MRU allocation, and one user field is configured for MRU and transmitted.

A. In MRU allocation, allocation to an RU included in an 80 MHz segment other than the allocated 80 MHz segment may be indicated (or allocated) using empty information (or puncturing information). By using 0011101(242-tone RU empty (with zero users), 0011110 (484-tone RU; contributes zero User fields to the User Specific field in the same HE-SIG-B content channel as this RU Allocation subfield), 0011111 (484-tone RU; contributes zero User fields to the User Specific field in the same HE-SIG-B content channel as this RU Allocation subfield), 01000000 (996-tone RU; contributes zero User fields to the User Specific field in the same HE-SIG-B content channel as this RU Allocation subfield) among the indices of the RU allocation subfield, it is allocated through the EHT-SIG CC of the 80 MHz segment (80 MHz segment other than the allocated 80 MHz segment) that the RU is being used for the MRU. When the RU allocation subfield is set to empty, it may be determined that the indicated channel (or RU) is punctured. If the RU allocation subfield is set to zero User fields, it may be determined that the RU allocation subfield is being used by another user.

B. When an RU of an 80 MHz segment other than the 80 MHz segment allocated as described above is used for the MRU, the EHT-SIG content channel may be configured by including only the RU allocation information and by not including user specify information or user field.

3) For example, when MRU aggregation such as 484(2)+996 RU is used at 160 MHz, the STA using the corresponding MRU is allocated to the first 80 MHz segment, and in this case, the EHT-SIG is configured as follows.

A. The first RU allocation subfield of EHT-SIG CC 1 and CC2 of the first 80 MHz segment includes allocation information for partial BW not included in the MRU, the second RU allocation subfield included in each EHT-SIG CC1 and CC2 is set to the bit information corresponding to 484+996 RUs to indicate allocation to the MRU.

B. Because the second 80 MHz segment is all used for MRU aggregation, RU allocation subfields 1 and 2 included in EHT-SIG CC1 and CC2 may be set to 01000000 (01000000 (996-tone RU; contributes zero User fields to the User Specific field in the same HE-SIG-B content channel as this RU Allocation subfield) of the RU allocation table to indicate that there is no RU allocated to the STA parsed into the corresponding segment.

4) Unlike 1) above, in consideration of load balancing for the user field, when MRU is allocated, the STA may be allocated to an 80 MHz segment including a large size RU.

A. The RU allocation information may include information on the location of the corresponding RU when MRU allocation is performed, like the bit table described above.

The STA may be allocated to one segment of the 80 MHz segment including the MRU in consideration of load balancing.

B. Information on MRU allocation is transmitted through the EHT-SIG CC through the 80 MHz segment allocated in the same manner as above. Otherwise, the RU allocation field included in the EHT-SIG CC of the 80 MHz segment is set to empty or zero user field as described above and transmitted.

B. Therefore, when transmitting MU-PPDU for BW (160 MHz, 240 MHz, 320 MHz) over 80 MHz, the value of the number N of the RU allocation subfields included in the EHT-SIG content channel may be fixed to 2 and used.

i. In order to indicate that a fixed number of RU allocation subfields are used as described above, a subfield of the U-SIG may be used.

1) The subfield of the U-SIG consists of 1 bit, and when it is set to 0, it indicates that the number of RA fields increases according to BW like 802.11ax. When the subfield of the U-SIG is set to 1, it may indicate that the number of RA fields is fixed to 2. In the existing 802.11ax, the number of RU allocation subfields included in the EHT-SIG content channel continued to increase according to BW, and there was a problem of overhead. However, since 802.11be unconditionally configures the EHT-SIG content channel in units of 80 MHz, the number of RA fields included in the EHT-SIG content channel in the 80 MHz segment is always fixed to 2, thereby solving the problem of overhead.

2) The subfield of the U-SIG may be included in the version dependent field of the U-SIG.

3) The subfield of the U-SIG may be used to indicate a sub channel selective transmission (SST) operation.

ii. As described above, since the number of RU allocation subfields included in the common field is fixed and used, there is an advantage in that it is easy to maintain/match the symbol alignment of the EHT-SIG during 80 MHz segment transmission.

iii. As described above, there is an advantage in that signaling overhead can be reduced by using N=2 regardless of BW.

Hereinafter, the above-described embodiment will be described with reference to FIGS. 1 to 21.

Figure 22:
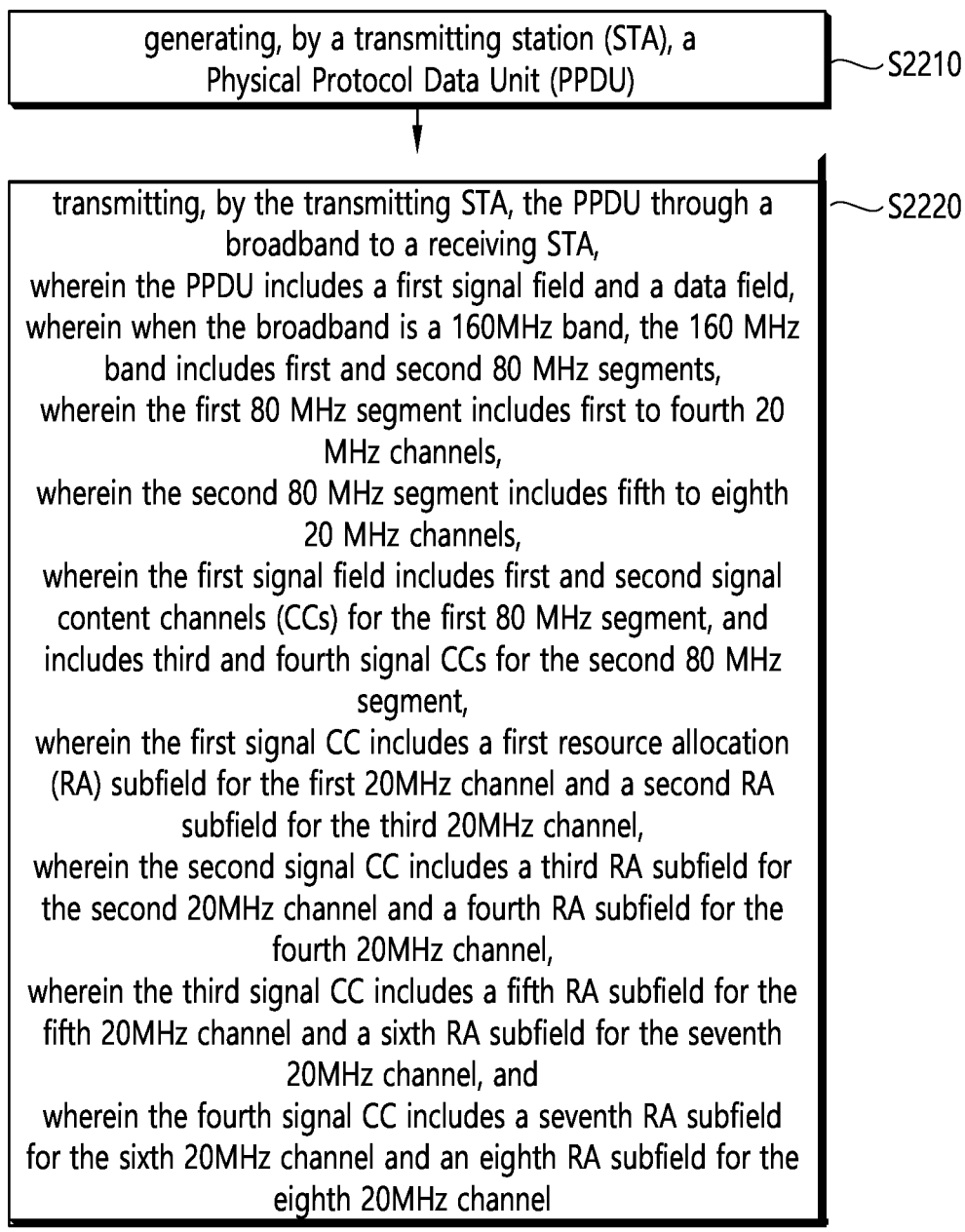
FIG. 22 is a flowchart illustrating a procedure in which a transmitting STA transmits a PPDU according to the present embodiment.

FIG. 22 is a flowchart illustrating a procedure in which a transmitting STA transmits a PPDU according to the present embodiment.

The example of FIG. 22 may be performed in a network environment in which a next-generation wireless LAN system (IEEE 802.11be or EHT wireless LAN system) is supported. The next-generation wireless LAN system is a wireless LAN system improved from the 802.11ax system, and may support backward compatibility with the 802.11ax system.

The example of FIG. 22 is performed by a transmitting STA, and the transmitting STA may correspond to an access point (AP). The receiving STA of FIG. 22 may correspond to an STA supporting an Extremely High Throughput (EHT) WLAN system.

This embodiment proposes a method of signaling allocation information for a Multiple Resource Unit (MRU) defined in an 802.11be WLAN system. In particular, this embodiment proposes a method of configuring an EHT-SIG including allocation information for an MRU.

In step S2210, the transmitting STA generates a PPDU (Physical Protocol Data Unit).

In step S2220, the transmitting STA transmits the PPDU to the receiving STA through a broadband.

The PPDU includes a first signal field and a data field. The first signal field may be an Extremely High Throughput-Signal (EHT-SIG).

When the broadband is a 160 MHz band, the 160 MHz band includes first and second 80 MHz segments. The first 80 MHz segment includes first to fourth 20 MHz channels, and the second 80 MHz segment includes fifth to eighth 20 MHz channels.

The first signal field includes first and second signal content channels (CCs) for the first 80 MHz segment, and includes third and fourth signal CCs for the second 80 MHz segment.

The first signal CC includes a first resource allocation (RA) subfield for the first 20 MHz channel and a second RA subfield for the third 20 MHz channel. The second signal CC includes a third RA subfield for the second 20 MHz channel and a fourth RA subfield for the fourth 20 MHz channel. The third signal CC includes a fifth RA subfield for the fifth 20 MHz channel and a sixth RA subfield for the seventh 20 MHz channel. The fourth signal CC includes a seventh RA subfield for the sixth 20 MHz channel and an eighth RA subfield for the eighth 20 MHz channel.

The first to fourth signal CCs may be EHT-SIG CCs and may be duplicated and used as follows.

The first signal CC may be duplicated for the first and third 20 MHz channels, the second signal CC may be duplicated for the second and fourth 20 MHz channels. That is, in the first 80 MHz segment, the first signal CC may be configured in the first 20 MHz channel, and the second signal CC may be configured in the second 20 MHz channel, the first signal CC may be configured again in the third 20 MHz channel, and the second signal CC may be configured again in the fourth 20 MHz channel.

Also, the third signal CC may be duplicated for the fifth and seventh 20 MHz channels, the fourth signal CC may be duplicated for the sixth and eighth 20 MHz channels. That is, in the second 80 MHz segment, the third signal CC may be configured in the fifth 20 MHz channel, and the fourth signal CC may be configured in the sixth 20 MHz channel, the third signal CC may be configured again in the seventh 20 MHz channel, and the fourth signal CC may be configured again in the eighth 20 MHz channel.

That is, two EHT-SIG-CCs may be configured in units of 80 MHz segments. The first EHT-SIG-CCs may be configured in the first 20 MHz channel and the third 20 MHz channel, and the second EHT-SIG-CC may be configured for the second 20 MHz channel and the fourth 20 MHz channel. In the existing 802.11ax wireless LAN system, as the bandwidth increases in PPDU transmission exceeding the 80 MHz band, the number of RA fields for each 20 MHz subchannel included in the EHT-SIG-CC increases, resulting in signaling overhead. Therefore, in this embodiment, the EHT-SIG-CC is configured only in units of 80 MHz segments, and the EHT-SIG-CC (consisting of two RA fields) is configured and duplicated for each 80 MHz segment even in PPDU transmission over broadband. So, there is an effect that signaling overhead can be reduced.

In particular, the receiving STA is assigned to a specific 80 MHz segment (by SST, etc.) and the receiving capability or decoding capability for the control field (including the SIG field) is 80 MHz, but this embodiment proposes a method of configuring an RA subfield when data is transmitted and received using an MRU included in the broadband as an operating band (160 MHz or higher).

In one example, it is assumed that the data field is transmitted through a first multiple resource unit (MRU) in which 484 resource unit (RU) and 996 RU are aggregated, and the receiving STA is allocated to the first 80 MHz segment by Subchannel Selective Transmission (SST). In this case, the 484 RU is a resource unit consisting of 484 tones, and the 996 RU is a resource unit consisting of 996 tones.

The first and third RA subfields may include allocation information for a partial band not included in the first MRU in the broadband. The second and fourth RA subfields may include allocation information for the first MRU. That is, The first MRU may be indicated through the first to fourth RA subfields (included in bit information) configured in the first 80 MHz segment to which the receiving STA is allocated.

Also, the fifth to eighth RA subfields may include information that 996 RUs included in the second 80 MHz segment are set as empty or zero user fields. Since the second 80 MHz segment is completely used for allocating the first MRU, the receiving STA decodes the fifth to eighth RA subfields (included in bit information) and it can be seen that there is no RU allocated to the STA parsed into the second 80 MHz segment.

The bit information included in the RA subfield may be defined as follows. Each of the first to eighth RA subfields may consist of 8 bits. 1 bit among the 8 bits may include information on whether the first to eighth RA subfields include allocation information for a single resource unit (SRU) or allocation information for an MRU. The 1 bit is the Most Significant Bit (MSB). When the 1 bit is set to 0, the RA subfield includes allocation information for the SRU, and when the 1 bit is set to 1, the RA subfield includes allocation information for the MRU.

Multi User-Multi Input Multi Output (MU-MIMO) may applied to RUs having a size of 242 RU or more allocated by the first to eighth RA subfields. The maximum number of users that can use the MU-MIMO may be eight. The 242 RU is a resource unit consisting of 242 tones.

The PPDU may further include a second signal field. The second signal field is an Universal-Signal (U-SIG).

The first and second signal fields may be decoded in units of 80 MHz. That is, the receiving STA may decode the first and second signal fields for each 80 MHz segment.

For example, when the receiving STA is allocated to the first 80 MHz segment by the SST, the first and second signal fields may be decoded by the receiving STA only for the first 80 MHz segment.

Also, the second signal field may include a first U-SIG for the first 80 MHz segment and a second U-SIG for the second 80 MHz segment.

The first U-SIG may include information on the number of RA subfields included in the first and second signal CCs and information on whether the SST is performed in the first 80 MHz segment. The second U-SIG may include information on the number of RA subfields included in the third and fourth signal CCs and information on whether the SST is performed in the second 80 MHz segment. However, the number of RA subfields included in the first and second signal CCs may be always set to two regardless of the bandwidth of the broadband, and the number of RA subfields included in the third and fourth signal CCs may be always set to two regardless of the bandwidth of the broadband. The receiving STA may decode a first U-SIG in the first 80 MHz segment and may decode a second U-SIG in the second 80 MHz segment.

The first signal field may include a common field and a user specific field. The first to eighth RA subfields may be included in the common field. The user information of the receiving STA may be included in the user specific field for the first 80 MHz segment and may not be included in the user specific field for the second 80 MHz segment. That is, when the receiving STA is allocated to the first 80 MHz segment by SST, but the receiving STA uses the first MRU including the RU included in the second 80 MHz segment. The user information of the receiving STA is not necessarily included in the user specific field for the second 80 MHz segment.

The PPDU may further include a legacy preamble. The legacy field may include a Legacy-Short Training Field (L-STF), a Legacy-Long Training Field (L-LTF), a Legacy-Signal (L-SIG), and a Repeated L-SIG (RL-SIG), and these may be configured for each 20 MHz channel.

FIG. 23 is a flowchart illustrating a procedure in which a receiving STA receives a PPDU according to the present embodiment.

The example of FIG. 23 may be performed in a network environment in which a next-generation wireless LAN system (IEEE 802.11be or EHT wireless LAN system) is supported. The next-generation wireless LAN system is a wireless LAN system improved from the 802.11ax system, and may support backward compatibility with the 802.11ax system.

The example of FIG. 23 is performed by the receiving STA and may correspond to a STA supporting an Extremely High Throughput (EHT) WLAN system. The transmitting STA of FIG. 23 may correspond to an access point (AP).

This embodiment proposes a method of signaling allocation information for a Multiple Resource Unit (MRU) defined in an 802.11be WLAN system. In particular, this embodiment proposes a method of configuring an EHT-SIG including allocation information for an MRU.

In step S2310, the receiving station (STA) receives a Physical Protocol Data Unit (PPDU) from the transmitting STA through a broadband.

In step S2320, the receiving STA decodes the PPDU.

The PPDU includes a first signal field and a data field. The first signal field may be an Extremely High Throughput-Signal (EHT-SIG).

When the broadband is a 160 MHz band, the 160 MHz band includes first and second 80 MHz segments. The first 80 MHz segment includes first to fourth 20 MHz channels, and the second 80 MHz segment includes fifth to eighth 20 MHz channels.

The first signal field includes first and second signal content channels (CCs) for the first 80 MHz segment, and includes third and fourth signal CCs for the second 80 MHz segment.

The first signal CC includes a first resource allocation (RA) subfield for the first 20 MHz channel and a second RA subfield for the third 20 MHz channel. The second signal CC includes a third RA subfield for the second 20 MHz channel and a fourth RA subfield for the fourth 20 MHz channel. The third signal CC includes a fifth RA subfield for the fifth 20 MHz channel and a sixth RA subfield for the seventh 20 MHz channel. The fourth signal CC includes a seventh RA subfield for the sixth 20 MHz channel and an eighth RA subfield for the eighth 20 MHz channel.

The first to fourth signal CCs may be EHT-SIG CCs and may be duplicated and used as follows.

The first signal CC may be duplicated for the first and third 20 MHz channels, the second signal CC may be duplicated for the second and fourth 20 MHz channels. That is, in the first 80 MHz segment, the first signal CC may be configured in the first 20 MHz channel, and the second signal CC may be configured in the second 20 MHz channel, the first signal CC may be configured again in the third 20

MHz channel, and the second signal CC may be configured again in the fourth 20 MHz channel.

Also, the third signal CC may be duplicated for the fifth and seventh 20 MHz channels, the fourth signal CC may be duplicated for the sixth and eighth 20 MHz channels. That is, in the second 80 MHz segment, the third signal CC may be configured in the fifth 20 MHz channel, and the fourth signal CC may be configured in the sixth 20 MHz channel, the third signal CC may be configured again in the seventh 20 MHz channel, and the fourth signal CC may be configured again in the eighth 20 MHz channel.

That is, two EHT-SIG-CCs may be configured in units of 80 MHz segments. The first EHT-SIG-CCs may be configured in the first 20 MHz channel and the third 20 MHz channel, and the second EHT-SIG-CC may be configured for the second 20 MHz channel and the fourth 20 MHz channel. In the existing 802.11ax wireless LAN system, as the bandwidth increases in PPDU transmission exceeding the 80 MHz band, the number of RA fields for each 20 MHz subchannel included in the EHT-SIG-CC increases, resulting in signaling overhead. Therefore, in this embodiment, the EHT-SIG-CC is configured only in units of 80 MHz segments, and the EHT-SIG-CC (consisting of two RA fields) is configured and duplicated for each 80 MHz segment even in PPDU transmission over broadband. So, there is an effect that signaling overhead can be reduced.

In particular, the receiving STA is assigned to a specific 80 MHz segment (by SST, etc.) and the receiving capability or decoding capability for the control field (including the SIG field) is 80 MHz, but this embodiment proposes a method of configuring an RA subfield when data is transmitted and received using an MRU included in the broadband as an operating band (160 MHz or higher).

In one example, it is assumed that the data field is transmitted through a first multiple resource unit (MRU) in which 484 resource unit (RU) and 996 RU are aggregated, and the receiving STA is allocated to the first 80 MHz segment by Subchannel Selective Transmission (SST). In this case, the 484 RU is a resource unit consisting of 484 tones, and the 996 RU is a resource unit consisting of 996 tones.

The first and third RA subfields may include allocation information for a partial band not included in the first MRU in the broadband. The second and fourth RA subfields may include allocation information for the first MRU. That is, The first MRU may be indicated through the first to fourth RA subfields (included in bit information) configured in the first 80 MHz segment to which the receiving STA is allocated.

Also, the fifth to eighth RA subfields may include information that 996 RUs included in the second 80 MHz segment are set as empty or zero user fields. Since the second 80 MHz segment is completely used for allocating the first MRU, the receiving STA decodes the fifth to eighth RA subfields (included in bit information) and it can be seen that there is no RU allocated to the STA parsed into the second 80 MHz segment.

The bit information included in the RA subfield may be defined as follows. Each of the first to eighth RA subfields may consist of 8 bits. 1 bit among the 8 bits may include information on whether the first to eighth RA subfields include allocation information for a single resource unit (SRU) or allocation information for an MRU. The 1 bit is the Most Significant Bit (MSB). When the 1 bit is set to 0, the RA subfield includes allocation information for the SRU, and when the 1 bit is set to 1, the RA subfield includes allocation information for the MRU.

Multi User-Multi Input Multi Output (MU-MIMO) may applied to RUs having a size of 242 RU or more allocated by the first to eighth RA subfields. The maximum number of users that can use the MU-MIMO may be eight. The 242 RU is a resource unit consisting of 242 tones.

The PPDU may further include a second signal field. The second signal field is an Universal-Signal (U-SIG).

The first and second signal fields may be decoded in units of 80 MHz. That is, the receiving STA may decode the first and second signal fields for each 80 MHz segment.

For example, when the receiving STA is allocated to the first 80 MHz segment by the SST, the first and second signal fields may be decoded by the receiving STA only for the first 80 MHz segment.

Also, the second signal field may include a first U-SIG for the first 80 MHz segment and a second U-SIG for the second 80 MHz segment.

The first U-SIG may include information on the number of RA subfields included in the first and second signal CCs and information on whether the SST is performed in the first 80 MHz segment. The second U-SIG may include information on the number of RA subfields included in the third and fourth signal CCs and information on whether the SST is performed in the second 80 MHz segment. However, the number of RA subfields included in the first and second signal CCs may be always set to two regardless of the bandwidth of the broadband, and the number of RA subfields included in the third and fourth signal CCs may be always set to two regardless of the bandwidth of the broadband. The receiving STA may decode a first U-SIG in the first 80 MHz segment and may decode a second U-SIG in the second 80 MHz segment.

The first signal field may include a common field and a user specific field. The first to eighth RA subfields may be included in the common field. The user information of the receiving STA may be included in the user specific field for the first 80 MHz segment and may not be included in the user specific field for the second 80 MHz segment. That is, when the receiving STA is allocated to the first 80 MHz segment by SST, but the receiving STA uses the first MRU including the RU included in the second 80 MHz segment. The user information of the receiving STA is not necessarily included in the user specific field for the second 80 MHz segment.

The PPDU may further include a legacy preamble. The legacy field may include a Legacy-Short Training Field (L-STF), a Legacy-Long Training Field (L-LTF), a Legacy-Signal (L-SIG), and a Repeated L-SIG (RL-SIG), and these may be configured for each 20 MHz channel 3. Apparatus/Device Configuration The technical features of the present specification described above may be applied to various devices and methods. For example, the above-described technical features of the present specification may be performed/supported through the apparatus of FIGS. 1 and/or 11. For example, the above-described technical features of the present specification may be applied only to a part of FIGS. 1 and/or 11. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 11 For example, the apparatus of the present specification may receive a Physical Protocol Data Unit (PPDU) from a transmitting STA through a broadband; and decodes the PPDU.

The technical features of the present specification may be implemented based on a CRM (computer readable medium). For example, CRM proposed by the present specification is at least one computer readable medium including at least one computer readable medium including instructions based on being executed by at least one processor.

The CRM may store instruction that perform operations comprising receiving a Physical Protocol Data Unit (PPDU) through a broadband from a transmitting STA; and decoding the PPDU. The instructions stored in the CRM of the present specification may be executed by at least one processor. At least one processor related to CRM in the present specification may be the processor(s) 111 and/or 121 or the processing chip(s) 114 and/or 124 of FIG. 1, or the processor 610 of FIG. 11. Meanwhile, the CRM of the present specification may be the memory(s) 112 and/or 122 of FIG. 1, the memory 620 of FIG. 11, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a Wireless Local Area Network (WLAN) system, the method comprising:
    receiving, by a receiving station (STA), a Physical Protocol Data Unit (PPDU) through a broadband from a transmitting STA; and
    decoding, by the receiving STA, the PPDU,
    wherein the PPDU includes a first signal field and a data field,
    wherein when the broadband is a 160 MHz band, the 160 MHz band includes first and second 80 MHz segments, wherein the first 80 MHz segment includes first to fourth 20 MHz channels, wherein the second 80 MHz segment includes fifth to eighth 20 MHz channels, wherein the first signal field includes first and second signal content channels (CCs) for the first 80 MHz segment, and includes third and fourth signal CCs for the second 80 MHz segment, wherein the first signal CC includes a first resource allocation (RA) subfield for the first 20 MHz channel and a second RA subfield for the third 20 MHz channel, wherein the second signal CC includes a third RA subfield for the second 20 MHz channel and a fourth RA subfield for the fourth 20 MHz channel, wherein the third signal CC includes a fifth RA subfield for the fifth 20 MHz channel and a sixth RA subfield for the seventh 20 MHz channel, and wherein the fourth signal CC includes a seventh RA subfield for the sixth 20 MHz channel and an eighth RA subfield for the eighth 20 MHz channel.

2. The method of claim 1, wherein the first signal CC is duplicated for the first and third 20 MHz channels, wherein the second signal CC is duplicated for the second and fourth 20 MHz channels, wherein the third signal CC is duplicated for the fifth and seventh 20 MHz channels, wherein the fourth signal CC is duplicated for the sixth and eighth 20 MHz channels.

3. The method of claim 1, wherein when the data field is transmitted through a first multiple resource unit (MRU) in which 484 resource unit (RU) and 996 RU are aggregated, and the receiving STA is allocated to the first 80 MHz segment by Subchannel Selective Transmission (SST), the first and third RA subfields include allocation information for a partial band not included in the first MRU in the broadband, the second and fourth RA subfields include allocation information for the first MRU, the fifth to eighth RA subfields include information that 996 RUs included in the second 80 MHz segment are set as empty or zero user fields, wherein the 484 RU is a resource unit consisting of 484 tones, wherein the 996 RU is a resource unit consisting of 996 tones.

4. The method of claim 3, wherein the PPDU further includes a second signal field, wherein the first and second signal fields are decoded in units of 80 MHZ, wherein when the receiving STA is allocated to the first 80 MHz segment by the SST, the first and second signal fields are decoded by the receiving STA only for the first 80 MHz segment.

5. The method of claim 4, wherein the first signal field is an EHT-SIG (Extremely High Throughput-Signal), wherein the second signal field is an U-SIG (Universal-Signal), wherein the first signal field includes a common field and a user specific field, wherein the first to eighth RA subfields are included in the common field, wherein the user information of the receiving STA is included in the user specific field for the first 80 MHz segment and is not included in the user specific field for the second 80 MHz segment.

6. The method of claim 5, wherein the second signal field includes a first U-SIG for the first 80 MHz segment and a second U-SIG for the second 80 MHz segment, wherein the first U-SIG includes information on the number of RA subfields included in the first and second signal CCs and information on whether the SST is performed in the first 80 MHz segment, wherein the second U-SIG includes information on the number of RA subfields included in the third and fourth signal CCs and information on whether the SST is performed in the second 80 MHz segment, wherein the number of RA subfields included in the first and second signal CCs is always set to two regardless of the bandwidth of the broadband, wherein the number of RA subfields included in the third and fourth signal CCs is always set to two regardless of the bandwidth of the broadband.

7. The method of claim 1, wherein each of the first to eighth RA subfields consists of 8 bits, wherein 1 bit among the 8 bits includes information on whether the first to eighth RA subfields include allocation information for a single resource unit (SRU) or allocation information for an MRU, wherein Multi User-Multi Input Multi Output (MU-MIMO) is applied to RUs having a size of 242 RU or more allocated by the first to eighth RA subfields, wherein the 242 RU is a resource unit consisting of 242 tones.

8. A receiving station (STA) in a Wireless Local Area Network (WLAN) system, the receiving STA comprising:

a memory;

a transceiver; and a processor operatively coupled to the memory and transceiver, wherein processor is configured to:
receive a Physical Protocol Data Unit (PPDU) through a broadband from a transmitting STA; and
decode the PPDU, wherein the PPDU includes a first signal field and a data field, wherein when the broadband is a 160 MHz band, the 160 MHz band includes first and second 80 MHz segments, wherein the first 80 MHz segment includes first to fourth 20 MHz channels, wherein the second 80 MHz segment includes fifth to eighth 20 MHz channels, wherein the first signal field includes first and second signal content channels (CCs) for the first 80 MHz segment, and includes third and fourth signal CCs for the second 80 MHz segment, wherein the first signal CC includes a first resource allocation (RA) subfield for the first 20 MHz channel and a second RA subfield for the third 20 MHz channel, wherein the second signal CC includes a third RA subfield for the second 20 MHz channel and a fourth RA subfield for the fourth 20 MHz channel, wherein the third signal CC includes a fifth RA subfield for the fifth 20 MHz channel and a sixth RA subfield for the seventh 20 MHz channel, and wherein the fourth signal CC includes a seventh RA subfield for the sixth 20 MHz channel and an eighth RA subfield for the eighth 20 MHz channel.

9. A method in a Wireless Local Area Network (WLAN) system, the method comprising:

generating, by a transmitting station (STA), a Physical Protocol Data Unit (PPDU); and transmitting, by the transmitting STA, the PPDU through a broadband to a receiving STA, wherein the PPDU includes a first signal field and a data field, wherein when the broadband is a 160 MHz band, the 160 MHz band includes first and second 80 MHz segments, wherein the first 80 MHz segment includes first to fourth 20 MHz channels, wherein the second 80 MHz segment includes fifth to eighth 20 MHz channels, wherein the first signal field includes first and second signal content channels (CCs) for the first 80 MHz segment, and includes third and fourth signal CCs for the second 80 MHz segment, wherein the first signal CC includes a first resource allocation (RA) subfield for the first 20 MHz channel and a second RA subfield for the third 20 MHz channel, wherein the second signal CC includes a third RA subfield for the second 20 MHz channel and a fourth RA subfield for the fourth 20 MHz channel, wherein the third signal CC includes a fifth RA subfield for the fifth 20 MHz channel and a sixth RA subfield for the seventh 20 MHz channel, and wherein the fourth signal CC includes a seventh RA subfield for the sixth 20 MHz channel and an eighth RA subfield for the eighth 20 MHz channel.

10. The method of claim 9, wherein the first signal CC is duplicated for the first and third 20 MHz channels, wherein the second signal CC is duplicated for the second and fourth 20 MHz channels, wherein the third signal CC is duplicated for the fifth and seventh 20 MHz channels, wherein the fourth signal CC is duplicated for the sixth and eighth 20 MHz channels.

11. The method of claim 9, wherein when the data field is transmitted through a first multiple resource unit (MRU) in which 484 resource unit (RU) and 996 RU are aggregated, and the receiving STA is allocated to the first 80 MHz segment by Subchannel Selective Transmission (SST), the first and third RA subfields include allocation information for a partial band not included in the first MRU in the broadband, the second and fourth RA subfields include allocation information for the first MRU, the fifth to eighth RA subfields include information that 996 RUs included in the second 80 MHz segment are set as empty or zero user fields, wherein the 484 RU is a resource unit consisting of 484 tones, wherein the 996 RU is a resource unit consisting of 996 tones.

12. The method of claim 11, wherein the PPDU further includes a second signal field, wherein the first and second signal fields are decoded in units of 80 MHZ, wherein when the receiving STA is allocated to the first 80 MHz segment by the SST, the first and second signal fields are decoded by the receiving STA only for the first 80 MHZ segment.

13. The method of claim 12, wherein the first signal field is an EHT-SIG (Extremely High Throughput-Signal), wherein the second signal field is an U-SIG (Universal-Signal), wherein the first signal field includes a common field and a user specific field, wherein the first to eighth RA subfields are included in the common field, wherein the user information of the receiving STA is included in the user specific field for the first 80 MHz segment and is not included in the user specific field for the second 80 MHz segment.

14. The method of claim 13, wherein the second signal field includes a first U-SIG for the first 80 MHz segment and a second U-SIG for the second 80 MHz segment, wherein the first U-SIG includes information on the number of RA subfields included in the first and second signal CCs and information on whether the SST is performed in the first 80 MHz segment, wherein the second U-SIG includes information on the number of RA subfields included in the third and fourth signal CCs and information on whether the SST is performed in the second 80 MHz segment, wherein the number of RA subfields included in the first and second signal CCs is always set to two regardless of the bandwidth of the broadband, wherein the number of RA subfields included in the third and fourth signal CCs is always set to two regardless of the bandwidth of the broadband.

15. The method of claim 9, wherein each of the first to eighth RA subfields consists of 8 bits, wherein 1 bit among the 8 bits includes information on whether the first to eighth RA subfields include allocation information for a single resource unit (SRU) or allocation information for an MRU, wherein Multi User-Multi Input Multi Output (MU-MIMO) is applied to RUs having a size of 242 RU or more allocated by the first to eighth RA subfields, wherein the 242 RU is a resource unit consisting of 242 tones.

* * * * *